US010414935B2

(12) United States Patent
Bepete et al.

(10) Patent No.: US 10,414,935 B2
(45) Date of Patent: Sep. 17, 2019

(54) AQUEOUS AND ORGANIC SUSPENSIONS OF EXFOLIATED NANOCARBON MATERIALS, METHOD FOR MAKING SAME AND USES THEREOF

(71) Applicant: Centre National de la Recherche Scientifique—CNRS, Paris (FR)

(72) Inventors: George Bepete, Pessac (FR); Carlos Drummond, Bordeaux (FR); Alain Penicaud, Bordeaux (FR)

(73) Assignee: Centre National de la Recherche Scientifique—CNRS, Paris (FR)

(*) Notice: Subject to any disclaimer, the term of this patent is extended or adjusted under 35 U.S.C. 154(b) by 23 days.

(21) Appl. No.: 15/318,173

(22) PCT Filed: Jun. 11, 2015

(86) PCT No.: PCT/EP2015/063075
§ 371 (c)(1),
(2) Date: Dec. 12, 2016

(87) PCT Pub. No.: WO2015/189335
PCT Pub. Date: Dec. 17, 2015

(65) Prior Publication Data
US 2017/0121179 A1    May 4, 2017

(30) Foreign Application Priority Data

Jun. 12, 2014  (EP) .................................. 14172164
Jul. 25, 2014   (EP) .................................. 14306204
(Continued)

(51) Int. Cl.
*C01B 32/174*  (2017.01)
*C01B 32/194*  (2017.01)
(Continued)

(52) U.S. Cl.
CPC ............ *C09D 11/52* (2013.01); *C01B 32/174* (2017.08); *C01B 32/19* (2017.08); *C01B 32/194* (2017.08)

(58) Field of Classification Search
CPC ............ C01B 31/0273; C01B 31/0469; C01B 31/0484; C01B 32/174; C01B 32/19; C01B 32/194; B82Y 30/00; B82Y 40/00
(Continued)

(56) References Cited

U.S. PATENT DOCUMENTS

2007/0189954 A1   8/2007  Pénicaud
2010/0176351 A1   7/2010  Ruoff et al.
(Continued)

OTHER PUBLICATIONS

International Search Report dated Oct. 23, 2015 out of PCT priority Application No. PCT/EP2015/063075 (3 pages).
(Continued)

*Primary Examiner* — Tri V Nguyen
(74) *Attorney, Agent, or Firm* — Brinks Gilson & Lione

(57) ABSTRACT

A method for preparing aqueous or organic suspensions of fully exfoliated nanocarbon materials includes a) dissolving a nanocarbon intercalation compound in an aprotic organic solvent (A) or a mixture (A') of aprotic organic solvents under inert atmosphere; b) re-oxidation to revert the reduced nanocarbon material to its neutral state; and c) mixing the organic suspension of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution; wherein solvent (A) or solvent mixture (A') is fully or partially water-miscible or fully or partially miscible with solvent (B) or solvent mixture (B'); thereby leading to an air-metastable aqueous or organic suspension of nanocarbon material.

34 Claims, 8 Drawing Sheets

(30) Foreign Application Priority Data

Feb. 13, 2015 (EP) .................................. 15155087
May 13, 2015 (EP) .................................. 15167536

(51) Int. Cl.
*B82Y 40/00* (2011.01)
*C09D 11/52* (2014.01)
*C01B 32/19* (2017.01)

(58) Field of Classification Search
USPC .................. 423/448, 460, 461; 977/840
See application file for complete search history.

(56) References Cited

U.S. PATENT DOCUMENTS

| | | |
|---|---|---|
| 2010/0237296 A1 | 9/2010 | Gilje |
| 2011/0124790 A1 | 5/2011 | Pénicaud |
| 2011/0186789 A1 | 8/2011 | Samulski |
| 2012/0063988 A1 | 3/2012 | Tour |
| 2015/0057417 A1* | 2/2015 | Tour .................. C07C 29/32 526/89 |

OTHER PUBLICATIONS

Written Opinion dated Oct. 23, 2015 out of PCT priority Application No. PCT/EP2015/063075 (9 pages).

* cited by examiner

FIG. 6A Height distribution

FIG. 13A

| Excitation Energy (eV) | D Pos | D FWHM | G Pos | G FWHM | D' Pos | D' FWHM | 2D Pos | 2D FWHM | $I_D/I_G$ | $I_D/I_{D'}$ | $I_{2D}/I_G$ |
|---|---|---|---|---|---|---|---|---|---|---|---|
| 2.33 | 1345 | 27 | 1586 | 21 | 1620 | 16 | 2681 | 28 | 1.5 | 9.0 | 2.0 |

FIG. 13B

| Excitation Energy (eV) | D | | G | | D' | | 2D | | $I_D/I_G$ | $I_D/I_{D'}$ | $I_{2D}/I_G$ |
|---|---|---|---|---|---|---|---|---|---|---|---|
| | ω | 2Γ | ω | 2Γ | ω | 2Γ | ω | 2Γ | | | |
| 2.33 | 1345 | 27 | 1586 | 21 | 1620 | 16 | 2681 | 28 | 1.5 | 9.0 | 2.0 |
| 1.94 | 1325 | 26 | 1585 | 23 | 1617 | 17 | 2643 | 30 | 2.7 | 6.9 | 2.7 |
| 1.58 | 1303 | 28 | 1586 | 23 | 1612 | 18 | 2599 | 27 | 4.4 | 6.6 | 2.3 |
| 1.17 | 1277 | 34 | 1586 | 25 | 1605 | 19 | 2543 | 28 | 4.2 | 5.5 | * |

FIG. 13

AQUEOUS AND ORGANIC SUSPENSIONS OF EXFOLIATED NANOCARBON MATERIALS, METHOD FOR MAKING SAME AND USES THEREOF

This application claims priority to International Application No. PCT/EP2015/063075 filed Jun. 11, 2015; to European Application No. 14172164.7 filed Jun. 12, 2014; to European Application No. 14306204.0 filed Jul. 25, 2014; to European Application No. 15155087.8 filed Feb. 13, 2015; and to European Application No. 15167536.0 filed May 13, 2015; the entire contents of each are incorporated herein by reference.

PRIORITY

This application claims priority to Provisional European Patent Applications no. EP 14172164, EP 15155087 and EP 151677536 filed on 12 Jun. 2014, 13 Feb. 2015 and 13 May 2015 respectively, and European Patent Application no. EP 14306204 filed on 25 Jul. 2014, the entire contents of each of which are hereby incorporated by reference.

TECHNICAL FIELD

The present invention relates to a method for preparing aqueous and organic suspensions of fully exfoliated, i.e. individualized, nanocarbon materials, and uses thereof, including the manufacture of composites, films and deposits.

The present invention more particularly relates to aqueous and organic nanocarbon suspensions (i.e., ink compositions), in particular aqueous and organic suspensions of fully exfoliated nanocarbons, as well as uses of such nanocarbon suspensions. Accordingly, the present invention also relates to the preparation of aqueous and organic inks, and uses thereof.

Being able to obtain nanocarbons in the form of aqueous or organic suspensions is of a great interest from an industrial application point of view, more particularly with respect to processing these suspensions for a given application. Specifically, such suspensions can readily be used to deposit nanocarbons on a given substrate, to form nanocarbon films or to manufacture, nanocarbon-containing composites.

In the description that follows, the references between square brackets ([ ]) refer to the list of references given after the examples.

STATE OF THE ART

Carbon is known as having four unique crystalline structures or structure families: diamond, graphite, fullerenes and carbon nanotubes.

The tubular structure of carbon nanotubes confers unique mechanical, electric or chemical properties to them. For that reason, carbon nanotubes are commonly used in composite materials (Shaffer, M. S. P., Windle, A. H., "Fabrication and Characterization of Carbon Nanotube/poly(vinyl alcohol) Composites", Adv. Mater., 11, pp 937-941 (1999) [1]), hydrogen fuel cells (Ye, Y., Ahn, C. C., Witham, C., Fultz, B., Liu, J., Rinzler, A. G., Colbert, D., Smith, K. A., Smalley, R. E., "Hydrogen Absorption And Cohesive Energy Of Single-Walled Carbon Nanotubes", App. Phys. Lett., 74, pp 307-2309 (1999) [2]; Liu, C., Fan, Y. Y., Liu, M., Cong, H. T., Cheng, H. M., Dresselhaus. M. S., "Hydrogen Storage In Single-Walled Carbon Nanotubes At Room Temperature", Science, 286, pp 1127-1129 (1999) [3]; Kong, J., Chapline, M. G., Dai, H., "Functionalized Carbon Nanotubes For Molecular Hydrogen Sensors", Adv. Mater. 13, 1384-1386 (2001) [4], supercapacitors (Aldissi, M.; Schmitz, B.; Lazaro, E.; Bhamidipati, M.; Dixon, B., "Conducting Polymers in Ultracapacitor Applications", 56th Annu. Tech. Conf.—Soc. Plast. Eng., (Vol. 2), pp 1197-1201 (1998) [5]; An, K. H.; Kim, W. S.; Park, Y. S.; Moon, J.-M.; Bae, D. J.; Lim, S. C.; Lee, Y. S.; Lee, Y. H. "Electrochemical Properties of High-Power Supercapacitors Using Single-Walled Carbon Nanotube Electrodes", Adv. Funct. Mater. 11, pp 387-392 (2001) [6], catalysis (Yu, R., Chen, L., Liu, Q., Lin, J., Tan, K.-L., Ng, S. C., Chan, H. S. O., Xu, G.-Q., Hor, T. S. A. "Platinum Deposition On Carbon Nanotubes Via Chemical Modification", Chem, Mater. 10, pp 718-722 (1998) [7]; (Planeix, J. M.; Coustel, N.; Coq, B.; Brotons, V.; Kumbhar, P. S.; Dutartre, R.; Geneste, P.; Bernier, P.; Ajayan, P. M., "Application Of Carbon Nanotubes As Supports in Heterogeneous Catalysis", J. Am, Chem, Soc. 116, pp 7935-7936 (1994) [8]) and nanometric-size electronic components or systems (Tans, S. J., Verschueren, A. R. M., Dekker, C., "Room-Temperature Transitor Based On A Single Carbon Nanotube", Nature 393, pp 49-52 (1998) [9]; Bachtold, A.; Hadley, P.; Nakanishi, T.; Dekker, C., "Logic Circuits With Carbon Nanotube Transistors". Science 294 pp, 1317-1320 (2001) [10]).

The scientific community has also developed an interest for alternative carbon nanomaterials that have comparable properties such as graphene, or other valuable properties such as carbon nanohorns, nanodiamonds and fullerenes.

One challenge has been to process these nanocarbon materials into solutions or suspensions to enable their manipulation and industrial processing, notably for preparing composite materials, films or deposits on substrates. The vast majority of research efforts towards preparing solutions or suspensions of nanocarbon forms (i.e., carbon nanotubes and graphene) resulted in methods with a major drawback: the resulting carbon nanotubes and graphene planes end up being functionalised and/or denatured, which is detrimental to their electrical properties, or poorly exfoliated. [Paton, K. R. et al. Scalable production of large quantities of defect free few-layer graphene by shear exfoliation in liquids. *Nat. Mater.* (2014) [23]]

The first successful method for preparing carbon nanotube solutions in organic solvents was reported by Penicaud et al. (WO 2005/073127 [11]). Penicaud et al. also pioneered methods for solubilizing graphene and carbon nanohorns in organic solvents: WO 2009/056696 [12] and WO 2011/154894 [13], respectively. The methods allow access to individualized (fully exfoliated) carbon nanotubes, [Concentrated Solutions of Individualized Single Walled Carbon Nanotubes, A. Pénicaud, F. Dragin, G. Pécastaings, M. He, E. Anglaret, Carbon (2014), 67, 360-367 [24]] graphene planes, and carbon nanohorns (no defects), which are useful in a variety of applications including deposits of these nanocarbon forms on substrates and incorporating them in composites. However, one drawback of these methods is that the nanocarbon organic solutions must be handled under inert atmosphere, which can be costly for industrial-scale applications.

Thus, there exists a real need for methods for solubilizing nanocarbons that remedy these problems, drawbacks and obstacles known in the art, more particularly a method allowing to obtain aqueous or organic suspensions of fully exfoliated nanocarbons that can readily be used in ambient atmosphere for processing nanocarbon materials for a given application, thereby reducing nanocarbon compositions manufacturing costs, facilitating storage and improving accessibility to nanocarbons in large quantity.

DETAILED DESCRIPTION OF CERTAIN EXEMPLARY EMBODIMENTS OF THE INVENTION

In a first aspect, the present invention specifically aims at meeting such need by providing a method for preparing aqueous or organic suspensions of fully exfoliated nanocarbon materials, comprising steps of:
- a) dissolving a nanocarbon intercalation compound in an aprotic organic solvent (A) or a mixture (A') of aprotic organic solvents under inert atmosphere; thereby leading to an organic solution of reduced nanocarbon;
- b) re-oxidation (removal of electrons) to revert the reduced nanocarbon material to its neutral state to lead to an organic suspension of neutral nanocarbon material in the organic solvent (A) or a mixture (A') of aprotic organic solvents; and
- c) mixing the organic suspension of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution;

wherein solvent (A) or solvent mixture (A') is fully or partially water-miscible or fully or partially miscible with solvent (B) or solvent mixture (B');

thereby leading to an air-metastable aqueous or organic suspension of nanocarbon material.

As used throughout the document, the expression "degassed mixture of (B) or (B') with water or an aqueous ionic solution" means that the overall mixture of (B) or (B') with water or an aqueous ionic solution is degassed.

Advantageously, in any variant where they may be involved (for example in step a)), solvent A or mixture of solvent A' may be degassed before using it in step a) to dissolve the nanocarbon intercalation compound (also termed "nanocarbide salt").

After re-oxidation step b), the system becomes somewhat unstable and step c) should be a follow up to step b) to stabilize the system (thanks to the adsorption of ions on the surface of the nanocarbon material, as described further below).

Advantageously, step c) may preferably be carried out immediately after step b).

When the nanocarbon material is carbon nanotubes, it may be advantageous not to carry out step b) and to proceed directly with step c). As such, there is provided a method for preparing aqueous or organic dispersions of fully exfoliated (individualized) carbon nanotubes, comprising steps of:
- a) dissolving a carbon nanotube alkali salt in an aprotic organic solvent (A) or a mixture (A') of aprotic organic solvents under inert atmosphere; thereby leading to an organic solution of reduced carbon nanotubes (also referred to as "carbon nanotubide solution"); and
- c) mixing the organic solution of reduced carbon nanotubes obtained in step a) with a suitable amount of degassed water, degassed ionic aqueous solution, degassed organic solvent (B), degassed mixture (B') of organic solvents, or degassed mixture of (B) or (B') with water or an aqueous ionic solution;

wherein solvent (A) or solvent mixture (A') is fully or partially water-miscible or fully or partially miscible with solvent (B) or solvent mixture (B');

thereby leading to an air-metastable aqueous or organic dispersion of carbon nanotubes.

The carbon nanotube alkali salt may have any C:M ratio achievable by methods known in the art, M representing any alkali metal, such as Na, Li, K, Rb or Cs, preferably Na, Li or K. Carbon nanotubes may be reduced by a variety of known methods, and the resulting MCx salt can be isolated with a wide range of x values ranging from 6 to over 500 (x being an integer). For example, carbon nanotubes may be reduced directly in the presence of any alkali metal, such as Na, Li, K, Rb or Cs, preferably Na, Li or K. Thus, the reduction can be carried out directly in the presence of an alkali metal, for example in liquid or vapour phase or in ammonia. Reduction methods in the presence of an alkali metal are well known in the art (See for example [18], [25]), and lead to CNT alkali salts with a wide possible range of stoichiometry as described above, typically of maximum stoichiometry $MC_6$ to $MC_8$ where M represents the alkali metal (maximum stoichiometry $KC_6$ to $KC_8$ when the alkali metal is potassium metal). Alternatively, carbon nanotubes may be reduced by reacting a suitable polyaryl alkali salt having the formula $A^+B^-$ with carbon nanotubes under inert atmosphere, wherein $A^+$ represents an alkali metal cation and $B^-$ represents an anion of an organic radical, as described in more detail infra (See for example [11], [18], [49], [50]). Likewise, with this method also, the resulting ACx salt can be isolated with a wide range of x values ranging from 10 to 500 (for example A=K).

For example, when the alkali metal is K, the carbon nanotube alkali salt may have $KC_6$, $KC_8$, $KC_{25}$, $KC_{100}$ or $KC_{200}$ stoichiometry. As carbon nanotube alkali salts with higher C content (lower K content) are expected to exhibit fewer defects when subjected to the mixing step c) (e.g., quenching with degassed water, degassed ionic aqueous solution, etc.) carbon nanotube alkali salts with higher C content are generally preferred. Advantageously, the carbon nanotube alkali salt is $KC_{25}$ or a nanotube potassium salt with a C content greater than or equal to $KC_{25}$, for example $KC_{25}$, $KC_{100}$, $KC_{200}$, $KC_{370}$, $KC_{500}$ or a nanotube potassium salt with a C:K stoichiometry ranging anywhere between $KC_{25}$ and $KC_{500}$.

The carbon nanotubes may be single-walled (SWCNT), double-walled (DWCNT), few-walled (FWCNT) or multi-walled (MWCNT) carbon nanotubes, preferably single-walled, double-walled or few-walled carbon nanotubes, most preferably single-walled carbon nanotubes.

Advantageously, in any variant where step c) may be involved, when a degassed organic solvent (B) or degassed mixture (B') of organic solvents is used in step c), (B) and mixture (B') preferably contain ionic species able to interact with the carbon surface of the nanocarbons. Preferably, the ionic species are able to adsorb on the carbon surface of the nanocarbons. As such, (B) and solvent mixture (B') preferably allow full or partial dissociation of salt species. The ionic species may be any ions able to adsorb on the carbon surface of nanocarbons. For example, the ionic species may be hydrophobic ions. For example, suitable hydrophobic ions include phenylsubstituted ions, such as tetraphenyl phosphonium, tetraphenylborate or tetraphenylarsonium for example. The ionic species may also include other ions such as $OH^-$, $H_3O^+$, ammonium ($NH_4^+$) or substituted ammonium ions, or ionic species susceptible of π-π interactions with the nanocarbons, such as but not limited to phenylsubstituted hydrophobic ions (e.g., tetraphenyl phosphonium, tetraphenylborate or tetraphenylarsonium to mention a few). Advantageously, the ionic species may be any species that bears a π stacking entity, able to facilitate adsorption onto the nanocarbon surface. Examples of such ionic species are those bearing a polyaromatic entity such as naphthalenyl, anthracenyl, pyrenyl, perylenyl radical, etc . . . bearing a polar moiety ("polar head"), and their respective families.

Within those, ionic species from environmentally friendly salts will be preferred. Examples of those are 1-pyrene sulfonic acid salts, 2-Naphtoxyacetic acid salts, or 2-naphthalenesulfonate salts, preferably 1-pyrene sulfonic acid salts or 2-Naphtoxyacetic acid salts. Urate ions may also be used.

Likewise, in any variant where step c) may be involved, advantageously, when a degassed mixture of (B) or (B') with water or an aqueous ionic solution is used in step c), the resulting degassed mixture preferably contains ionic species that are able to interact with (e.g., to adsorb on) the carbon surface of the nanocarbons. The ionic species may be any ions able to adsorb on the carbon surface of nanocarbons. For example, the ionic species may be hydrophobic ions or any species that bears a π stacking entity, able to facilitate adsorption onto the nanocarbon surface, such as those mentioned above. For example, the resulting degassed mixture may contain ionic species that are either $OH^-$, $H_3O^+$, ammonium ($NH_4^+$) or substituted ammonium ions, or ionic species susceptible of π-π interactions with the nanocarbons, such as but not limited to phenylsubstituted hydrophobic ions (e.g., tetraphenyl phosphonium, tetraphenylborate or tetraphenylarsonium to mention a few) or polyarylsubstituted ions such as naphthalenyl, anthracenyl, pyrenyl, perylenyl radicals, etc . . . bearing a polar moiety (e.g., 1-pyrenyl sulfonate ions, 2-Naphtoxyacetate ions, 2-naphthalenylsulfonate ions, preferably 1-pyrenyl sulfonate ions or 2-Naphtoxyacetate ions).

The aforementioned ion adsorption on the nanocarbon surface is believed to help stabilize the suspension of nanocarbon material obtained in step c).

The degassed mixture of (B) or (B') with an aqueous ionic solution aqueous may be prepared by a method comprising a step of mixing (B) or (B') with water, and then adding one or more suitable salt species that yield one or more of the aforementioned ionic species able to interact with (e.g., to adsorb on) the carbon surface of the nanocarbons. Alternatively, or additionally, the degassed mixture of (B) or (B') with an aqueous ionic solution aqueous may be prepared by a method comprising a step of mixing (B) or (B') with an ionic aqueous solution containing one or more of the aforementioned ionic species. The resulting mixture may be degassed subsequently.

In one variant, step a) may be followed by the addition of a suitable ionic species in the organic solution of reduced nanocarbon obtained in step a), prior to carrying out step b). As such, there is provided a method for preparing aqueous or organic dispersions of fully exfoliated nanocarbon materials, comprising steps of:
- a) dissolving a nanocarbon intercalation compound in an aprotic organic solvent (A) or a mixture (A') of aprotic organic solvents under inert atmosphere; thereby leading to an organic solution of reduced nanocarbon;
- a') adding a suitable ionic species to the organic solution of reduced nanocarbon obtained in step a), under inert atmosphere;
- b) re-oxidation (removal of electrons) to revert the reduced nanocarbon material to its neutral state to lead to an organic dispersion of neutral nanocarbon material in the organic solvent (A) or a mixture (A') of aprotic organic solvents; and
- c) mixing the organic dispersion of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution;

wherein solvent (A) or solvent mixture (A') is fully or partially water-miscible or fully or partially miscible with solvent (B) or solvent mixture (B');

thereby leading to an air-metastable aqueous or organic dispersion of nanocarbon material.

As used herein, the expression "inert atmosphere" refers to a gas or a gaseous mixture which does not favour re-oxidation of the reduced nanocarbon material into its neutral state. For example, step a) and/or step a') may be carried out under an oxygen and moisture-free atmosphere. Advantageously, step a) and/or step a') may be carried out under an argon, helium or nitrogen gas atmosphere.

The ionic salt species added in step a') may be any one or more of the ionic species mentioned previously, and may be added as such, or in solution in a suitable organic solvent. The organic solvent may be degassed. When added in solution in an organic solvent, preferably the ionic species is added as a solution in the same solvent (A) or solvent mixture (A') used in step a). Solvent (A) or solvent mixture (A') may be degassed.

In variant "a)+a')", since an ionic species is added between steps a) and b), step c) may simply comprise mixing the organic dispersion of neutral nanocarbon obtained in step b) with a suitable amount of degassed water, degassed organic solvent (B), degassed mixture (B') of organic solvents, or degassed mixture of (B) or (B') with water. Alternatively, more ionic species may be added via step c) by mixing the organic dispersion of neutral nanocarbon obtained in step b) with a suitable amount of degassed ionic aqueous solution, degassed organic solvent (B) containing an ionic species, degassed mixture (B') of organic solvents containing an ionic species, or degassed mixture of (B) or (B') with an aqueous ionic solution. The ionic species added via step c) may be the same or different from that added via step a'). In exemplary embodiments, the same ionic species is added via steps a') and c).

With respect to "variant a) +a')", the concentration of ionic species to be added (via step a') alone, or via both steps a') and c)) may be selected/adjusted depending on A (A') and the concentration of nanocarbide salt in solution. Indeed, the nanocarbide being a polyelectrolyte salt, it is prone to flocculation upon salt addition above a certain threshold due to screening of electrostatic repulsion. Accordingly, the amount of ionic salt that may be added is preferably such that it does not provoke/cause flocculation of the nanocarbide. Typically, the amount of ionic species added after step a) is such that the ionic species concentration in the organic solution of reduced nanocarbon preferably may not exceed 10 mM. For example, when sodium tetraphenylborate is used as ionic salt, advantageously the amount added may be such that the concentration in tetraphenylborate ions in the organic solution of reduced nanocarbon is about 1 mM.

Likewise, as mentioned for an earlier variant drawn to carbon nanotubes, with respect to variant "a)+a')", when the nanocarbon materials is carbon nanotubes, it may be advantageous not to carry out step b). As such, there is provided a method for preparing aqueous or organic dispersions of fully exfoliated (individualized) carbon nanotubes, comprising steps of:
- a) dissolving a carbon nanotube alkali salt in an aprotic organic solvent (A) or a mixture (A') of aprotic organic solvents under inert atmosphere; thereby leading to an organic solution of reduced carbon nanotubes (also referred to as "carbon nanotubide solution");
- a') adding a suitable ionic species to the organic solution of reduced carbon nanotubes obtained in step a), under inert atmosphere; and c) mixing the organic solution obtained in step a') with a suitable amount of degassed water, degassed ionic aqueous solution, degassed organic solvent (B), degassed mixture (B') of organic solvents, or degassed mixture of (B) or (B') with water or an aqueous ionic solution;

wherein solvent (A) or solvent mixture (A') is fully or partially water-miscible or fully or partially miscible with solvent (B) or solvent mixture (B');

thereby leading to an air-metastable aqueous or organic dispersion of carbon nanotubes. Advantageously step c) may be carried out under conditions that spontaneously provoke re-oxidation of the carbon nanotubides (i.e., carbon nanotube alkali salt), to revert them to their neutral state (carbon nanotubes). Such conditions include:

using a degassed protic solvent in step c). This condition may be fulfilled when degassed water, a degassed ionic aqueous solution, or degassed mixture of (B) or (B') with water or an aqueous ionic solution step b), is used in step c). It may also be fulfilled when step c) is carried out with a degassed organic solvent (B) or a degassed mixture (B') of organic solvents, wherein the organic solvent (B) and the organic solvents of mixture (B') are selected from the alcohols such as methanol, ethanol, n-propanol, i-propanol, n-butanol, 2-butanol, n-pentanol, 2-pentanol, or n-hexanol carrying out step c), by mixing the organic solution of reduced carbon nanotubes obtained in step a) with a suitable amount of degassed organic solvent (B) or degassed mixture (B') of organic solvents, containing a suitable oxidant different than oxygen, wherein (B) and (B') are aprotic organic solvents. Suitable oxidants comprise but are not limited to iodine, $FeCl_3$, $NOPF_6$.

Advantageously, when step c) is carried out under conditions that spontaneously provoke re-oxidation of the carbon nanotubides, the step of mixing may be carried out slowly to quench the carbon nanotubides in as mild a way as possible. For example, the organic solution of reduced carbon nanotubes obtained in step a) may be added dropwise to a suitable amount of degassed water, degassed ionic aqueous solution, degassed organic solvent (B), degassed mixture (B') of organic solvents, or degassed mixture of (B) or (B') with water or an aqueous ionic solution.

All the variants and embodiments described above for the carbon nanotube variant with respect to the carbon nanotube alkali salt C:M ratio are applicable mutatis mutandis here with respect to variant "a)+a')". For example, when the alkali metal is K, the carbon nanotube alkali salt may have $KC_6$, $KC_8$, $KC_{25}$, $KC_{100}$ or $KC_{200}$ stoichiometry. Advantageously, the carbon nanotube alkali salt is $KC_{25}$ or a nanotube potassium salt with a C content greater than or equal to $KC_{25}$, for example $KC_{25}$, $KC_{100}$, $KC_{200}$, $KC_{370}$, $KC_{500}$ or a nanotube potassium salt with a C:K stoichiometry ranging anywhere between $KC_{25}$ and $KC_{500}$.

For all variants described herein, any aggregates that may be present can be removed by mild centrifugation, such as described elsewhere in this document (cf. step a1).

Advantageously, the resulting nanocarbon dispersion obtained after step c) may be stable for a long time (at least several days but more often several weeks or months) allowing processing without the need to remove solvent A or mixture of solvent A'.

For all variants described herein, advantageously, when carrying out step c), the ratio of A or A' to (i) water (or (ii) to ionic aqueous solution or (iii) to B or B' or (iv) to mixture of water with B or B' or (v) to mixture of ionic aqueous solution with B or B') may be appropriately selected/adjusted/optimized by simple eye (or optical microscope) observation of dispersion stability.

The resulting suspension of nanocarbon material will be termed "aqueous suspension" or "aqueous dispersion" when mixing step c) involves degassed water, a degassed ionic aqueous solution, or a degassed mixture of (B) or (B') with water or an aqueous ionic solution.

Likewise, the resulting suspension will be termed "organic suspension" or "organic dispersion" when mixing step c) involves a single degassed organic solvent (B) or a degassed mixture (B') of organic solvents.

Re-oxidation step b) may spontaneously occur when exposing the solution obtained in step a), or in step a') when variant "a)+a')" is used, to air (including dry air) or water.

Re-oxidation step b) may simply comprise allowing the organic solution of reduced nanocarbon obtained in step a), or in step a') when variant "a)+a')" is used, to stand at ambient atmosphere (i.e., in the presence of oxygen gas and moisture). For example, the organic solution of reduced nanocarbon may be left to stand at ambient atmosphere for a few seconds to several days, for example from 15 seconds to 2 hours, for example from 15 seconds to 1 hour, preferably for 30 seconds to 1 minute. Alternatively, or additionally, re-oxidation step b) may comprise exposing the organic solution of reduced nanocarbon obtained in step a), or in step a') when variant "a)+a')" is used, to an oxygen source, such as oxygen gas. For example, a stream of oxygen gas or dry air may be bubbled through the organic solution of reduced nanocarbon obtained in step a), or in step a') when variant "a)+a')" is used, for a suitable amount of time.

Re-oxidation step b) may also be effected by adding a suitable oxidant different than oxygen (in solid, gaseous, liquid or solution (i.e. dissolved in a solvent) form) in the solution of reduced nanocarbon obtained in step a), or in step a') when variant "a)+a')" is used. In that case, step b) may be carried out under inert atmosphere. Suitable oxidants comprise but are not limited to iodine, $FeCl_3$, $NOPF_6$, and step b) may optionally be carried out under inert atmosphere.

Re-oxidation step b) may also be effected by electrochemistry and may optionally be carried out under inert atmosphere. Thus, the reduced nanocarbon solution obtained in step a), or in step a') when variant "a)+a')" is used, may be oxidized by electrochemical means; in which case step b) may be optionally carried out under inert atmosphere.

Re-oxidation step b) may also be effected while carrying out step c), by mixing the organic solution of reduced nanocarbon obtained in step a), or in step a') when variant "a)+a')" is used, with a suitable amount of degassed organic solvent (B) or degassed mixture (B') of organic solvents, containing a suitable oxidant different than oxygen, provided that (B) and (B') are aprotic organic solvents. Suitable oxidants comprise but are not limited to iodine, $FeCl_3$, $NOPF_6$; and step b) may optionally be carried out under inert atmosphere.

Advantageously, re-oxidation step b) has the effect of quenching the solution of reduced nanocarbon obtained in step a), or in step a') when variant "a)+a')" is used, in a mild fashion, the negatively charged nanocarbon compound becoming neutral.

As used herein, "metastable" when referring to suspensions of fully exfoliated nanocarbon material according to the invention, takes the conventional meaning of thermodynamic metastability in the field of colloidal suspensions. In general, if several states are in principle accessible to a colloidal suspension under given conditions, that with the lowest potential is called the stable state, while the other states are described as metastable. Likewise, as used herein, "metastable suspension" means that the suspension is in a state of equilibrium corresponding to a thermodynamic potential local minimum.

As used herein, the term "air-metastable", when referring to aqueous or organic suspensions/dispersions of fully exfoliated nanocarbon material according to the invention, means "metastable in air" and refers to suspensions/dispersions that are not oxygen- or water-sensitive, for example to ambient air.

Advantageously, a single aprotic organic solvent may be used in step a) and/or in step a') (i.e., aprotic organic solvent (A)). Again, the single solvent (A) may be degassed.

When an organic solvent mixture (A') is used in step a) and/or in step a'), it may be a binary, ternary, or higher-order solvent mixture (i.e., mixture or two, three, or more aprotic organic solvents). Preferably, (A') may be a binary or ternary, most preferably binary organic solvent mixture.

Advantageously, the aprotic organic solvent(s) used in step a) and/or in step a') may be polar. As used herein, "polar" when referring to organic solvents, including the aprotic organic solvent(s) of step a) and/or step a') refers to any organic solvent having a dielectric constant $\varepsilon \geq 4$.

Throughout the present document, unless mentioned otherwise, all dielectric constant values ($\varepsilon$) are provided with reference to a temperature of 25° C. In other words, unless mentioned otherwise, the expression "dielectric constant $\varepsilon \geq n$" means "dielectric constant $\varepsilon \geq n$ at 25° C.".

For example, the aprotic organic solvent (A) and the aprotic organic solvents in organic solvent mixture (A') may have a dielectric constant $\varepsilon \geq 4$, $\varepsilon \geq 5$, $\geq 6$, $\geq 7$, $\geq 8$, $\geq 9$ or $\geq 10$ at 25° C. Exemplary polar aprotic organic solvents that may be used in step a) and/or in step a'), as single solvent (A) or mixture (A'), include, but are not limited to, tetrahydrofuran (THF), methyl-THF (Me-THF), dimethylsulfoxide (DMSO), N-methylpyrrolidone (NMP), dimethylformamide (DMF), N-methylformamide (NMF), sulfolane, acetone, acetonitrile, nitromethane, dimethoxyethane (DME), ethylacetate, 2-butanone, methyl tert-butyl ether (MTBE), diethyl ether, CycloPentylMethylEther (CPME), dichloromethane, or a mixture of two or more of these. Preferably, the polar aprotic organic solvents that may be used in step a) and/or in step a'), as single solvent (A) or mixture (A'), may be THF, DMSO, NMP, DMF, NMF, CPME or sulfolane; preferably THF or DMSO. Preferably, a single polar solvent (A) may be used in step a) and/or in step a'), selected from THF or DMSO.

As mentioned previously, solvent A or mixture of solvent A', in any variant where they may be involved, may be degassed before using it in step a) to dissolve the nanocarbon intercalation compound, whether step a) may be followed by step a') or directly by step b).

Advantageously, the organic solvent (B) may be any organic solvent that is miscible with aprotic organic solvent (A) or aprotic organic solvent mixture (A'). Likewise, the organic solvents of mixture (B') may be made of any two or more organic solvents miscible with (A) or (A'). Advantageously, (B) and the solvents of mixture (B') may be any organic solvents that allow partial or full dissociation of a salt species, for example a salt species that leads to ionic species mentioned above (e.g., hydrophobic ions such as phenylsubstituted ions, for example tetraphenyl phosphonium, tetraphenylborate or tetraphenylarsonium to mention a few; urate ions; polyarylsubstituted ions such as naphthalenyl, anthracenyl, pyrenyl, perylenyl, etc . . . bearing a polar moiety (e.g., 1-pyrene sulfonic acid salts, 2-Naphtoxyacetic acid salts, 2-naphthalenesulfonate salts, or urate salts of these).

In general, any organic solvent that may support ionization of a salt species may be used as solvent (B) or in mixture (B'). Exemplary organic solvents that may be used in step c), as solvent (B) or mixture (B'), include, but are not limited to:
 the polar aprotic solvents listed above for (A) and (A');
 alcohols such as methanol, ethanol, n-propanol, i-propanol, n-butanol, 2-butanol, n-pentanol, 2-pentanol, n-hexanol;
 esters such as methyl acetate, ethyl acetate, propyl acetate, butyl acetate, methyl propionate;
 ketones such as acetone, butanone, 2-pentanone, 3-pentanone, cyclopentanone, cyclohexanone;
 aromatic solvents such as benzonitrile, nitrobenzene, chlorobenzene, dichlorobenzene.
 halogenated solvents such as chloroform.

Advantageously, the organic solvent (B) and the organic solvents of mixture (B') may be water-miscible. For example, organic solvent (B) and the organic solvents of mixture (B') may be selected from the alcohols such as methanol, ethanol, n-propanol, i-propanol, n-butanol, 2-butanol, n-pentanol, 2-pentanol, or n-hexanol.

In the case of a solvent mixture (B'), one or more of the components of the mixture may be a non-polar organic solvent that would not on its own support ionization of a salt species, provided that the overall solvent mixture (B') supports sufficient ionization to stabilize the suspension of nanocarbon material. For example, solvent mixture (B') may contain one or more non-polar organic solvent such as benzene, toluene, methyl naphthalene, diethyl ether, CycloPentylMethylEther (CPME), pentane, hexane, heptane, cyclohexane, 1,4-dioxane, mixed in with a sufficient amount of at least one organic solvent able to support ionization of a salt species, as detailed above, so that the overall mixture (B') allows dissociation of a suitable salt species (i.e., a salt species generating ionic species able to adsorb on the surface of the nanocarbon surface, such as those described above. For example, the ionic species may be hydrophobic ions, such as but not limited to phenylsubstituted hydrophobic ions (e.g., tetraphenyl phosphonium, tetraphenylborate or tetraphenylarsonium), polyarylsubstituted ions such as naphthalenyl, anthracenyl, pyrenyl, perylenyl, etc . . . bearing a polar moiety (e.g., 1-pyrene sulfonic acid salts, 2-Naphtoxyacetic acid salts, 2-naphthalenesulfonate salts, or urate salts of these, preferably 1-pyrene sulfonic acid salts or 2-Naphtoxyacetic acid salts). For example, (B') may be a mixture of (i) a water-miscible organic solvent such as an alcohol (e.g., methanol, ethanol, n-propanol, i-propanol, n-butanol, 2-butanol, n-pentanol, 2-pentanol, or n-hexanol), and (ii) one or more non-polar organic solvent such as benzene, toluene, methyl naphthalene, diethyl ether, CycloPentylMethylEther (CPME), pentane, hexane, heptane, cyclohexane, 1,4-dioxane. For example, (B') may be a mixture of methanol and toluene.

Advantageously, step c) may involve mixing the organic suspension of neutral nanocarbon obtained in step b) with a suitable amount of degassed mixture of (B) or (B') with water or an aqueous ionic solution.

For example, a degassed mixture of (B) with water or an aqueous ionic solution may be used in step c), wherein the degassed mixture may be a degassed mixture of water or an ionic aqueous solution and an organic solvent (B), in a ratio ranging anywhere between 100% water or ionic aqueous solution/0% (B) to 0% water or ionic aqueous solution/ 100% (B). Likewise, a degassed mixture of (B') with water or an aqueous ionic solution may be used in step c), wherein the degassed mixture may be a degassed mixture of water or an ionic aqueous solution and a water-miscible organic solvent mixture (B'), in a ratio ranging anywhere between 100% water or ionic aqueous solution/0% (B') to 0% water or ionic aqueous solution/100% (B'). For example, a degassed mixture 50% water/50% (B) or (B') may be used (e.g., 50% water/50% methanol or 50% water/50% ethanol).

Advantageously, the pH of the water used in step c) (alone or in mixture with (B) or (B')) may be adjusted to vary its ionic strength. For example, the pH may be adjusted by addition of any base or acid, such as, but not limited to, HCl, $HNO_3$, acetic acid, NaOH, KOH, $NH_4OH$. Any base or acid known in the art may be used to adjust the ionic strength of the degassed water (alone or in mixture with (B) or (B')) used in step c). Preferably, the pH adjustment may be carried out prior to degassing.

The 6 paragraphs that follow relate to the ionic aqueous solution referred to in step c), (alone or in mixture with (B) or (B')), preferably (but not necessarily) when step a') is not carried out and when step b) directly follows step a), and are applicable to any variant described herein where step c) may be involved:

The pH of the ionic aqueous solution may be adjusted to vary its ionic strength, much like the water pH adjusting described above. The pH adjustment may be effected by addition of any base or acid, such as, but not limited to, HCl, $HNO_3$, acetic acid, NaOH, KOH, $NH_4OH$. Any base or acid known in the art may be used to adjust the ionic strength of the ionic aqueous solution. Preferably, the pH adjustment may be carried out prior to degassing.

Advantageously, the ionic aqueous solution may contain ionic species such as $OH^-$, $H_3O^+$, ammonium ($NH_4^+$) or substituted ammonium ions such as tetrasubstituted ammonium ions, for example alkylammonium salts, such as tetraalkylammonium salts e.g. $Bu_4N^+$.

Advantageously, the ionic aqueous solution may contain hydrophobic ions such as, but not limited to, phenylsubstituted ions, polyarylsubstituted ions, urate ions, $BF_4^-$, $PF_6^-$ or $AsF_6^-$.

Advantageously, the ionic species may be ions that are either $OH^-$ or $H_3O^+$ or hydrophobic ions susceptible of π-π interactions with the nanocarbons, such as, but not limited to, phenyl containing ions such as tetraphenyl phosphonium, tetraphenylborate or tetraphenylarsonium and/or polyarylsubstituted ions such as naphthalenyl, anthracenyl, pyrenyl, perylenyl radicals, etc . . . bearing a polar moiety (e.g., 1-pyrenyl sulfonate ions, 2-Naphtoxyacetate ions, 2-naphthalenylsulfonate ions, preferably 1-pyrenyl sulfonate ions or 2-Naphtoxyacetate ions).

Advantageously, the ionic aqueous solution may be an aqueous solution of sodium tetraphenylborate ($B^-Ph_4Na^+$). The concentration of sodium tetraphenylborate may be 1 mmol/l.

Advantageously, the ionic aqueous solution may be an aqueous solution of tetraphenylarsonium chloride ($As^+Ph_4Cl^-$). The concentration of tetraphenylarsonium chloride may be 1 mmol/l.

Advantageously, step a) may be carried out at a temperature of −22 to 202° C., for example, at 20 to 25° C.

Generally speaking, the method according to the invention, more particularly step a), can be implemented with or without stirring. When a stirring system is used, it may be a mechanical or magnetic stirring system or mild sonication. Advantageously, the method may be carried out with a mechanical stirring. Advantageously, the method may be carried with a magnetic stirring.

It should be noted that, although the method of the invention can be implemented with a stirring system comprising sonication, the latter is not necessary. In fact, a remarkable advantage of the present method is that it is based on a soft dissolution method, starting from a neutral nanocarbon material, which precisely obviates the use of sonication and its resulting deleterious size shortening. Thus, the method of the invention allows obtaining large size fully exfoliated nanocarbon material.

In one variant of the method of the present invention, step a) and/or step a') may further comprise a centrifugation step a1), which allows separating any non dissolved fraction from the organic solution of reduced nanocarbon obtained in step a) and/or step a'), after dissolving the nanocarbon intercalation compound in the aprotic organic solvent (A) or mixture (A') of aprotic organic solvents, and optionally adding a suitable salt according to step a'). The person skilled in the art will know how to determine appropriate centrifugation conditions to obtain a reduced nanocarbon organic solution not including detectable aggregates. For example, centrifugation can be carried out between 100 and 200 000 g for 0.1 to 24 hours. In certain embodiments, the centrifugation step is carried out at 2 800 g for 1 hour.

Advantageously, the presence of aggregates in the organic solution of reduced nanocarbon during centrifugation may be checked with the naked eye. Thus, a sample of the organic solution of reduced nanocarbon can be taken at various intervals during centrifugation to determine whether the latter will allow obtaining a solution without aggregates visible with the naked eye. The naked eye examination allows detecting possible aggregates with a minimal size of the order of one tenth of a millimeter (100 microns).

Advantageously, the presence of aggregates in the organic solution of reduced nanocarbon during centrifugation may be checked using an optical microscope. Thus, a sample of the organic solution of reduced nanocarbon can be taken at various intervals during the centrifugation step to determine when the latter will have allowed obtaining a solution without any aggregates visible with an optical microscope. The optical microscope examination allows detecting possible aggregates having a minimal size of the order of one micron. For example, a solution sample can be analysed with an optical microscope having a magnification of 10 to 100.

Advantageously, the degassed water, ionic aqueous solution, organic solvent (B), organic solvent mixture (B') or mixture of (B) or (B') with water or an aqueous ionic solution used in step c), and solvents A and A' when degassed prior to use, may be degassed by any conventional method known in the art to get rid of any dissolved (mainly nitrogen and oxygen) gas. For example, A and A', and the degassed water, ionic aqueous solution, organic solvent (B), organic solvent mixture (B') or mixture of (B) or (B') with water or an aqueous ionic solution used in step c) may be degassed by placing the liquid to be degassed under reduced pressure and stirring (mechanical or magnetic stirring). For example, 150 ml of water can be degassed by applying a vacuum of 0.2 mbar during 30 minutes while stirring. In another example, the degassed water or degassed ionic aqueous solution used in step c) may be degassed by freeze pump thaw, preferably several cycles, for example 3 cycles.

Degassing the water, ionic aqueous solution, organic solvent (B), organic solvent mixture (B') or mixture of (B) or (B') with water or an aqueous ionic solution used in step c) is important.

Degassing A or A' prior to use in step a) and/or in step a'), may be advantageous but is not necessary: the inventive method can effectively and successfully be carried with or without degassing A/A' prior to use.

As vastly documented, nanocarbons are not soluble in water, or in most organic solvents. Although nanocarbons may be suspended in water with the aid of surfactants or in some organic solvents, in both cases, the nanocarbon dispersion is obtained at the cost of extensive shearing or sonication, thereby damaging the nanocarbon and reducing its size. In addition, the nanocarbon is poorly exfoliated at the end of the process. Dissolving a nanocarbon salt in a polar aprotic solvent as described in [11-13] allows full exfoliation (see also [24]) of the nanocarbon, but at the cost of air sensitivity (i.e., the resulting mixture is air sensitive).

Without wishing to be bound to any particular theory, it is generally suggested that when mixing the organic suspension of neutral nanocarbon obtained in step b) with degassed water, a degassed ionic aqueous solution, a degassed organic solvent (B), a degassed organic solvent mixture (B'), or a degassed mixture of (B) or (B') with water or an aqueous ionic solution, the absence of the ubiquitous gas layer at the surface of any hydrophobic material (nanocarbons) in contact with the solvent(s) (water or organic solvents (B) or (B')) forces the adsorption of ions onto the hydrophobic surface, thereby stabilizing the suspension of nanocarbons, and providing for the very first time a non-air sensitive system of fully exfoliated nanocarbons in aqueous or organic medium.

As used herein, the term "solubilize" when referring to nanocarbon materials in the context of the present invention refers to the formation of a solution of fully exfoliated nanocarbon materials, as defined herein.

As used herein, the term "solution of nanocarbons" refers to a composition where nanocarbon materials are in true solution in a solvent, as conventionally understood in the art. Advantageously, a nanocarbon solution is homogeneous. For example, the nanocarbon solution, after centrifugation, does not contain aggregates of nanocarbon materials. The absence of aggregates in the solution may be checked with the naked eye. Thus, a sample of the solution may be taken after centrifugation to determine whether a solution is obtained not including aggregates visible to the naked eye. The examination with the naked eye can detect any aggregates with a minimum size of the order of the 10th of a millimeter (100 microns). Preferably, the absence of aggregates in the solution may be checked by means of an optical microscope.

Examination by optical microscope allows detecting possible aggregates having a minimum size of one micron. In exemplary embodiments, the sample solution can be analyzed with an optical microscope with a magnification of 10 to 100. More fundamentally, the term "solution" refers to a thermodynamically stable system in which solute and solvent remain mixed indefinitely and do not phase separate after a certain time. A solution may present Tyndall effect due to scattering by colloidal particles if the nanoparticles (as is the case of nanotubes and graphene) have at least one dimension of the order of magnitude of the wavelength of light.

As used herein, the term "suspension" is used interchangeably with the term "dispersion", and means "dispersion" as conventionally understood in the art. As used herein, the term "suspension of nanocarbons" or "dispersion of nanocarbons" refers to a composition where nanocarbon materials are in suspension or dispersed in a solvent. In other words, the suspension contains solid particles of nanocarbon material suspended/dispersed in the solvent. Advantageously, the term "suspension of nanocarbons" or "dispersion of nanocarbons" in the context of the present invention refers to fully exfoliated nanocarbons (i.e., individualized nanocarbons). For example, when the nanocarbons are carbon nanotubes, "fully exfoliated" refers to the fact that the starting carbon nanotubes, which are typically in the form of bundles of aggregated nanotubes, are separated into individual carbon nanotubes. Likewise, when the nanocarbons are graphene, "fully exfoliated" refers to the fact that the starting graphite material, which is composed of aggregated/stacked graphene planes, is separated into individual graphene planes. The solvent may be water, an ionic aqueous solution, or a mixture of one or more organic solvents with water or an aqueous ionic solution, all of which may be fully or partially degassed, as described herein, in which case the suspension of nanocarbon is referred to as "aqueous suspension of nanocarbons" or "aqueous dispersion of nanocarbons". The solvent may be a degassed organic solvent or a degassed mixture of two or more organic solvents, as described herein, in which case the suspension of nanocarbon is referred to as "organic suspension of nanocarbons" or "organic dispersion of nanocarbons". Within the context of the present invention, a suspension or dispersion is fundamentally defined as a metastable system, i.e. a system which phases will eventually separate after a certain amount of time.

Both suspensions and solutions of nanocarbons may conventionally be referred to as "inks" in the art. However, in the context of the present invention, the term "ink" refers to a suspension of fully exfoliated nanocarbons obtainable by a method of the present invention, for example when the aqueous or organic suspension of nanocarbons is used for the manufacture of films or deposits of nanocarbons.

As used herein, the term "nanocarbon" or "nanocarbon material" designates ordered carbon-based structures of nanometric dimension. The expression "carbon-based structures of nanometric dimension" is understood to refer to a material whose size ranges from about the thickness of a graphene plane to a few nanometers in at least one of the spatial dimensions. For example, the size of the material in at least one of the spatial dimensions is between 0.3 and 20 nm, preferably between 0.3 and 10 nm, most preferably between 0.3 and 2 nm. Nanocarbons include carbon nanotubes, nanodiamonds, carbon nanohorns, graphene and fullerenes-type materials (e.g., C60 and C60 polymers, C70 and higher fullerenes), or any hydrogenated or partially hydrogenated forms of these, such as hydrogenated or any partially hydrogenated graphene (e.g., graphyne, graphane). Other ordered carbon forms such as cup stacked nanocarbons, carbon nanocones, and the like, or any hydrogenated or partially hydrogenated forms thereof, are also encompassed by the term "nanocarbon". Nanocarbons include i) nanocarbon compounds having a single definable structure (e.g., individual carbon nanotubes (single- (SWCNT), double- (DWCNT), few- (FWCNT) and multi-walled (MW-CNT)), exfoliated graphene planes from graphite, or individual carbon nanohorns, nanodiamonds, fullerenes); or ii) aggregates of nanocarbon structures (e.g., pristine carbon nanotubes, stacked graphene planes (i.e. graphite or turbostratic carbon), pristine nanodiamonds, or pristine carbon nanohorns.

"Nanocarbon intercalation compound" or "NIC" as used herein refers to a compound comprising at least two negatively or positively charged individual nanocarbons and intercalated by positive or negative counter ions, respectively. Nanocarbon alkali salts are an example of NIC where the individual nanocarbon structures are negatively charged and the counter-ions are alkali ions. When the nanocarbon structure is a graphene plane, the NIC is referred to as GIC ("Graphite intercalation compound").

"Pristine carbon nanotubes" as used herein refers to aggregates of carbon nanotubes in the form of bundles as conventionally understood in the art. In the present application, the expression "reduced carbon nanotubes" refers to bundles of carbon nanotubes that are negatively charged and neutralized by positive alkali metal counterions. The expression "individualized carbon nanotubes" or "individual carbon nanotubes" refers to carbon nanotubes bundles which have been exfoliated into individual nanotubes, i.e. nanotubes which are separated from one another.

"Pristine carbon nanohorns" as used herein refers to spherical aggregates of carbon nanohorns as conventionally understood in the art. The "carbon nanohorns" in the present invention are generally intended to include a "dahlia-like" aggregate of a plurality of horn-shaped bodies with their closed portions oriented outward, and an assembly of a plural groups each composed of a plurality of horn-shaped bodies.

The carbon nanohorns as defined above may also be referred to herein as "CNHs" (as a plural) for brevity.

CNHs generally have a tubular structure like a carbon nanotube, formed by a cylindrically rounded graphite sheet and one end of the carbon nanohorn is formed in a conical shape. Usually CNHs are aggregated in a form so that the conical portions are projected like horns while the tubular parts are located in the center, held together by Van der Waals force and/or covalent bonds. Pristine CNHs to be used in the present invention may be those which are obtained by conventional methods.

For example, pristine carbon nanohorns include carbon nanohorns assembled in spherical-type aggregates, such as those that are typically obtained through the conventional laser ablation methods of irradiating the carbon substance of a raw material with a laser beam in an inert gas atmosphere (See for example, Iijima et al., Chem. Phys. Lett., 309 (1999) 165-170 [14]; and Azami et al., J. Phys. Chem., (2008), 112, 1330-1334 [15]). The expression "pristine carbon nanohorns" as used herein refers to carbon nanohorns assembled in spherical-type aggregates, in general, regardless of the synthetic method used. For example, carbon nanohorns described in U.S. Pat. No. 7,501,024 [16] are included.

Another term that may be used interchangeably with "pristine carbon nanohorns" is "carbon nanohorn aggregate". Such aggregates may have a dahlia shape, a bud shape, a seed shape, or an intermediate shape among those shapes.

In general, each nanohorn in the carbon nanohorn aggregate is formed of at least one tube part and one conical part capping one end of the tube part. Nanohorns may have more than one tube parts (i.e., they may be branched). For example, they may have three tube parts (tripods). These have been reported for example in Zhang et al., J. Phys. Chem. C, 113, 11184-11186 (2009) [17].

"Graphite intercalation compound" or "GIC" as used herein refers to a compound comprising at least two individual negatively or positively charged graphene planes and intercalated by positive or negative counter ions. Graphite alkali salts are a particular example of GIC where the graphene planes are negatively charged and the counter-ions are alkali ions. The GIC can be in the form of a binary compound having the formula $MC_x$ where M represents a positive counter-ion of an alkali metal ($M^+$), and x represents an integer between 6 and 200. More particularly, the alkali metal can be potassium. For example, the GIC can be a binary compound having the formula $KC_8$.

In another embodiment, the GIC can be in the form of a ternary compound having the formula $M(Solv)_yC_x$ where M is an alkali metal ion ($M^+$), Solv is an aprotic solvent molecule, x represents an integer between 6 and 200 and y represents an integer between 0 and 4. The solvent molecule can be an aromatic solvent molecule (for example benzene or toluene) or a nucleophilic solvent molecule (for example, a solvent whose structure contains at least one oxygen atom, such as THF). For example, GIC can be a ternary compound with the formula $K(THF)C_{24}$ or $K(THF)_2C_{24}$.

"Reduced graphene" as used herein refers to one or more negatively charged individual graphene plane(s). The negative charge is delocalized onto the carbon atoms forming each individual graphene plane.

Advantageously, the graphite intercalation compound may be in the form of a binary compound of formula $MC_x$ where M represents a positive counter-ion of an alkali metal ($M^+$), and x represents an integer between 6 and 200. More particularly, the alkali metal can be potassium. For example, the graphite intercalation compound can be a binary compound of formula $KC_8$.

Advantageously, the graphite intercalation compound may be in the form of a ternary compound having the structure $M(Solv)_yC_x$ in which M is an alkali metal ion, Solv is a nucleophilic solvent whose structure contains at least one oxygen atom, x represents an integer between 6 and 200 and y represents an integer between 0 and 4. For example, the alkali metal may be potassium, the solvent may be THF and the graphite intercalation compound may be a ternary compound having the structure $K(THF)_yC_x$ where x represents an integer between 6 and 200, and y represents an integer between 0 and 4. In certain embodiments, the graphite intercalation compound is a ternary compound having the structure $K(THF)C_{24}$ or $K(THF)_2C_{24}$.

Nanocarbon Intercalation Compound

Advantageously, the nanocarbon intercalation compound (NIC) may be prepared by any method known in the art. For example, a NIC may be prepared by reduction of the corresponding nanocarbon material. Exemplary methods include reduction of a nanocarbon material by an alkali metal in vapour or liquid phase; electrochemical reduction of a nanocarbon material; and reduction of a nanocarbon material in the presence of an alkali metal salt of formula $A^+B^-$, wherein $A^+$ represents an alkali metal cation and $B^-$ represents an anion of an organic radical. See Doped Carbon Nanotubes, A. Pénicaud, P. Petit, J. E. Fischer, in Carbon Meta-Nanotubes: Synthesis, Properties and Applications, 1st Ed. Marc Monthioux Ed., John Wiley & Sons (2012), 41-111 [18].

Where the reduction involves an alkali metal or an alkali metal salt, the alkali metal can be any alkali metal allowing the implementation of the present invention. It can be selected for example from lithium, sodium, potassium, rubidium or cesium. Preferably, the alkali metal may be lithium, sodium or potassium.

For example, a NIC may be prepared by reduction of a nanocarbon material directly in the presence of an alkali metal, such as Na, Li, K, Rb or Cs, preferably Na, Li or K. Thus, the reduction can be carried out directly in the presence of an alkali metal, for example in liquid or vapour phase or in ammonia. Reduction methods in the presence of an alkali metal are well known in the art. The persons skilled in the art will know how to identify the appropriate experimental conditions for implementing a reduction method in the presence of an alkali metal, for example in vapour phase or in ammonia. For example, GICS can be prepared by reacting graphite and K at 100° C. (K is liquid) under argon atmosphere. In addition, the person skilled in the art can draw from the method described in "Synthesis of graphite intercalation compounds", A. Herold in Chemical physics of intercalation, A. P. Legrand and S. Flandrois Eds, NATO ASI Series, series B, Vol. 172, pp. 3-45 (1987) for example [19]. The methods described therein may be adapted to the preparation of other types of nanocarbon materials, such as carbon nanotubes, nanodiamonds, carbon nanohorns, and fullerenes. The skilled person in the art can also refer to the following publications for further teachings on alkali reduction of nanocarbons:

Alkali Metal Doping of Carbon Nanotubes:
Lee, R. S., Kim, H. J., Fischer, J. E. & Thess, A. letters to nature Conductivity enhancement in single-walled carbon nanotube bundles doped with K and Br. Nature 255-257 (1997). [25]

Alkali Metal Doping of Carbon Nanohorns:
WO 2011/154894

Alkali Metal Doping of Fullerenes:
Hebard, A. F.; Rosseinsky, M. J.; Haddon, R. C.; Murphy, D. W.; Glarum, S. H.; Palstra, T. T. M.; Ramirez, A. P.; Kortan, A. R. Nature, 1991, 350, 600. [26]

The reduction of the nanocarbon material may also be carried out in the presence of an alkali metal salt obtained from an alkali metal. For example, the reduction can be carried out in the presence of a polyaryl alkali salt having the formula $A^+B^-$, wherein $A^+$ represents a cation of an alkali ion and $B^-$ represents an anion of a polyaromatic compound. Such polyaryl alkali salts and methods for preparing them are described for example:

For Graphite Intercalation Compounds:
WO 2009/056696 [12]; C. Stein, J. Poulenard, L. Bonnetain, J. Golé, C. R. Acad. Sci. Paris 260, 4503 (1965) [20]; "Synthesis of graphite intercalation compounds", A. Herold in Chemical physics of intercalation, A. P. Legrand and S. Flandrois, Eds, NATO ASI Series, series B, Vol. 172, pp. 3-45 (1987) [21]; F. Béguin and R. Setton New ternary lamellar compounds of graphite, Carbon 13, 293-)295 (1975) [22];

For Carbon Nanotubes:
WO 2005/073127 [11]

For Carbon Nanohorns:
WO 2011/154894 [13]

Advantageously, the polyaromatic compound may be naphthalene, benzophenone, fluorenone, benzoquinone or anthraquinone, preferably naphthalene. Advantageously, the polyaryl alkali salt may be a polyaryl potassium salt (i.e., a salt of the formula $A^+B^-$, wherein A+ represents $K^+$). Advantageously, the polyaryl alkali salt of the formula $A^+B^-$ may be a naphthalene potassium salt ($Naph^-K^+$).

The reduction of the nanocarbon material may also be carried out by electrochemistry. The electrochemical reduction of the nanocarbon material takes place with the insertion of a counter cation present in the solution. [Hodge, S. A., Fogden, S., Howard, C. A., Skipper, N. T. & Shaffer, M. S. P. Electrochemical Processing of Discrete Single-Walled Carbon Nanotube Anions. ACS Nano 7, 1769-1778 (2013). [27]

Advantageously, the nanocarbon intercalation compound may be prepared by the addition of a polyaryl alkali salt having the formula $A^+B^-$ to a nanocarbon material under inert atmosphere, wherein:

$A^+$ represents a cation of an alkali ion, and
$B^-$ represents an anion of a polyaromatic compound.

Advantageously, the polyaromatic compound may be selected from the group consisting of naphthalene, benzophenone, fluorenone, benzoquinone and anthraquinone.

Advantageously, when the nanocarbon intercalation compound of step a) of the method of the present invention is prepared by reduction of a nanocarbon material in the presence of an alkali metal salt of formula $A^+B^-$, as described above, a filtration step can be performed after the formation of nanocarbon intercalation compound and prior to dissolving it in the aprotic organic solvent in step a). For example, when the preparation of nanocarbon intercalation compound involves a reduction in the presence of an alkali metal salt obtained from an alkali metal (for example, in the presence of a polyaryl alkali salt having the formula $A^+B^-$, as detailed above, filtration can allow separating the liquid phase (for example a solution of $K^+Napht^-$ in THF) from the solid phase comprising the nanocarbon intercalation compound. The resulting nanocarbon intercalated with an alkali metal can be rinsed one or more times with an appropriate solvent. The nanocarbon intercalation compound so rinsed may then be dried prior to dissolution in the aprotic organic solvent (A) or the mixture (A') of aprotic organic solvents.

In a variant, the method (in any of the embodiments/variants described above) may optionally further comprise a step d) of removing the aprotic organic solvent (A) or mixture (A') of aprotic organic solvents from the aqueous or organic mixture obtained in step c). As such, the method may comprise steps of:

a) dissolving a nanocarbon intercalation compound in an aprotic organic solvent (A) or a mixture (A') of aprotic organic solvents under inert atmosphere; thereby leading to an organic solution of reduced nanocarbon;

b) re-oxidation (removal of electrons) to revert the reduced nanocarbon material to its neutral state to lead to an organic suspension of neutral nanocarbon material in the organic solvent (A) or a mixture (A') of aprotic organic solvents;

c) mixing the organic suspension of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution;

wherein solvent (A) or solvent mixture (A') is fully or partially water-miscible or fully or partially miscible with solvent (B) or solvent mixture (B'); and d) removing the aprotic organic solvent (A) or mixture (A') of aprotic organic solvents from the aqueous or organic mixture obtained in step c);

thereby leading to an air-metastable aqueous or organic suspension of nanocarbon material.

In exemplary embodiments, step a) may be followed by step a') prior to carrying out step b), and/or may further comprise a centrifugation step a1), as described previously.

In exemplary embodiments, when the nanocarbon materials is carbon nanotubes, it may be advantageous not to carry out step b). As such, when the nanocarbon materials is carbon nanotubes, the method may comprise steps a), c) and d); or steps a), a'), c) and d); as described immediately above with the difference that step c) will refer to "mixing the organic solution of reduced carbon nanotubes obtained in step a) with . . . "; and/or may further comprise a centrifugation step a1), as described previously.

Step d) Variant:
For Air-Metastable Aqueous Suspensions of Nanocarbon Material

Advantageously, the aprotic organic solvent (A) or mixture (A') of aprotic organic solvents may be water-miscible.

Advantageously, the aprotic organic solvent (A) may be polar. Similarly, advantageously the aprotic organic solvents of mixture (A') may be polar. As such, solvent (A), and the solvents making up mixture (A') advantageously may have a dielectric constant ε≥4.

Advantageously, the aprotic organic solvent (A) may have a boiling point lower than that of water (i.e., the solvent boiling point is <100° C. at 1 atmosphere ($1.01325 \cdot 10^5$ Pa)). Similarly, advantageously the aprotic organic solvents of mixture (A') may have a boiling point lower than that of water.

Advantageously, the aprotic organic solvents (A) or of mixture (A') in step a) and/or in step a') may be fully miscible with water. Such solvents include, but are not limited to tetrahydrofuran (THF), acetone, acetonitrile, dimethoxyethane (DME), and the like.

The aprotic organic solvents (A) or of mixture (A') in step a) and/or step a') may be partially miscible with water. Such solvents include, but are not limited to ethylacetate, 2-butanone, methyl tert-butyl ether (MTBE), diethyl ether, dichloromethane, CycloPentylMethylEther (CPME) and the like.

Advantageously, the water-miscible aprotic organic solvents (A) or of mixture (A') used in step a) and/or in step a') may be any aprotic organic solvent with a boiling point lower than that of water and a dielectric constant ε≥4. The aprotic organic solvents may be fully miscible with water, or partially miscible with water. Advantageously, the water-miscible aprotic organic solvents (A) or of mixture (A') may be tetrahydrofuran (THF), acetone, acetonitrile, dimethoxyethane (DME), ethylacetate, 2-butanone, methyl tert-butyl ether (MTBE), diethyl ether, dichloromethane, petroleum ether, CycloPentylMethylEther (CPME) and the like. Advantageously, the water-miscible aprotic organic solvents (A) or of mixture (A') may be tetrahydrofuran (THF).

Advantageously, removal of the aprotic organic solvents (A) or of mixture (A') in step d) may be carried out by evaporation. Advantageously, the evaporation may be carried out by any conventional method known in the art. For example, a rotary evaporator may be used or the solvent mixture might simply be left standing for evaporation. Advantageously, in all these methods, care should be taken not to heat the mixture.

In exemplary embodiments, a single aprotic organic solvent (A) may used and the method comprises steps of:
a) dissolving a nanocarbon intercalation compound in a water-miscible aprotic organic solvent having a boiling point lower than that of water and a dielectric constant ε≥4, under inert atmosphere; thereby leading to an organic solution of reduced nanocarbon;
b) re-oxidation (removal of electrons) to revert the reduced nanocarbon material to its neutral state to lead to an organic suspension of neutral nanocarbon material in the organic solvent (A) or a mixture (A') of aprotic organic solvents;
c) mixing the organic suspension of neutral nanocarbon obtained in step b) with a suitable amount of degassed water, degassed ionic aqueous solution, or degassed mixture of (B) or (B') with water or an aqueous ionic solution; and
d) removing the water-miscible organic aprotic solvent from the aqueous mixture of step c), thereby leading to an aqueous suspension of fully exfoliated nanocarbon.

Likewise, in exemplary embodiments, step a) may be followed by step a') prior to carrying out step b), and/or may further comprise a centrifugation step a1), as described previously.

Likewise, in exemplary embodiments, when the nanocarbon materials is carbon nanotubes, it may be advantageous not to carry out step b). As such, when the nanocarbon materials is carbon nanotubes, the method may comprise steps a), c) and d); or steps a), a'), c) and d); as described immediately above with the difference that step c) will refer to "mixing the organic solution of reduced carbon nanotubes obtained in step a) with . . . "; and/or may further comprise a centrifugation step a1), as described previously.

For Air-Metastable Organic Suspensions of Nanocarbon Material

Advantageously, step c) may involve mixing the organic suspension of neutral nanocarbon obtained in step b) with a suitable amount of degassed organic solvent (B) or degassed mixture (B') of organic solvents.

Advantageously, the organic solvent (B) may have a boiling point greater than that of the aprotic organic solvents (A) or of mixture (A') used in step a) and/or step a'). Similarly, advantageously the organic solvents of mixture (B') may have a boiling point greater than that of the aprotic organic solvents (A) or of mixture (A') used in step a) and/or step a').

For example, the organic solvents (B) or of mixture (B') may have a dielectric constant ε≥4, ≥6, ≥8, or ≥10. Exemplary organic solvents (B) or of mixture (B') that may be used in step c) above include, but are not limited to, benzonitrile, nitrobenzene, chlorobenzene, dichlorobenzene, and alcohols such as but not limited to ethanol or isopropanol.

In exemplary embodiments, a single aprotic organic solvent (A) may be used and the method comprises steps of:
a) dissolving a nanocarbon intercalation compound in an aprotic organic solvent (A) having and a dielectric constant ε≥4, under inert atmosphere; thereby leading to an organic solution of reduced nanocarbon;
b) re-oxidation (removal of electrons) to revert the reduced nanocarbon material to its neutral state to lead to an organic suspension of neutral nanocarbon material in the organic solvent (A) or a mixture (A') of aprotic organic solvents;
c) mixing the organic suspension of neutral nanocarbon obtained in step b) with a suitable amount of degassed organic solvent (B) having a dielectric constant ε≥2 and a boiling point greater than that of the aprotic organic solvent (A) of step a) and/or step a'); and
d) removing the aprotic organic solvent (A) from the aqueous mixture of step c), thereby leading to an organic suspension of fully exfoliated nanocarbon in solvent (B).

Likewise, in exemplary embodiments, step a) may be followed by step a') prior to carrying out step b), and/or may further comprise a centrifugation step a1), as described previously.

Likewise, in exemplary embodiments, when the nanocarbon materials is carbon nanotubes, it may be advantageous not to carry out step b). As such, when the nanocarbon materials is carbon nanotubes, the method may comprise steps a), c) and d); or steps a), a'), c) and d); as described immediately above with the difference that step c) will refer to "mixing the organic solution of reduced carbon nanotubes obtained in step a) with . . . "; and/or may further comprise a centrifugation step a1), as described previously.

Film/Deposits

In a variant, the method may further optionally comprise a step d1) of depositing the aqueous or organic suspension of fully exfoliated nanocarbon of step c) or d) on a given substrate. Step d1) may be carried out with or without step d).

Thus, in exemplary embodiments, the method may comprise steps of:
- a) dissolving a nanocarbon intercalation compound in an aprotic organic solvent (A) or a mixture (A') of aprotic organic solvents under inert atmosphere; thereby leading to an organic solution of reduced nanocarbon;
- b) re-oxidation (removal of electrons) to revert the reduced nanocarbon material to its neutral state to lead to an organic suspension of neutral nanocarbon material in the organic solvent (A) or a mixture (A') of aprotic organic solvents;
- c) mixing the organic suspension of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution;
- wherein solvent (A) or solvent mixture (A') is fully or partially water-miscible or fully or partially miscible with solvent (B) or solvent mixture (B');
- thereby leading to an air-metastable aqueous or organic suspension of nanocarbon material; and
- d1) depositing the aqueous or organic suspension of fully exfoliated nanocarbon obtained in step c) on a substrate.

In other exemplary embodiments, the method may comprise steps of:
- a) dissolving a nanocarbon intercalation compound in an aprotic organic solvent (A) or a mixture (A') of aprotic organic solvents under inert atmosphere; thereby leading to an organic solution of reduced nanocarbon;
- b) re-oxidation (removal of electrons) to revert the reduced nanocarbon material to its neutral state to lead to an organic suspension of neutral nanocarbon material in the organic solvent (A) or a mixture (A') of aprotic organic solvents;
- c) mixing the organic suspension of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution;
- wherein solvent (A) or solvent mixture (A') is fully or partially water-miscible or fully or partially miscible with solvent (B) or solvent mixture (B');
- d) removing the aprotic organic solvent (A) or mixture (A') of aprotic organic solvents from the aqueous or organic mixture obtained in step c);
- thereby leading to an air-metastable aqueous or organic suspension of nanocarbon material; and
- d1) depositing the aqueous or organic suspension of fully exfoliated nanocarbon obtained in step d) on a substrate.

Likewise, in exemplary embodiments of the film/deposit variant, step a) may be followed by step a') prior to carrying out step b), and/or may further comprise a centrifugation step a1), as described previously.

Likewise, in exemplary embodiments, when the nanocarbon materials is carbon nanotubes, it may be advantageous not to carry out step b). As such, when the nanocarbon materials is carbon nanotubes, the method may comprise steps a), c), d) and d1); or steps a), c), and d1); or steps a), a'), c), d) and d1); or steps a), a'), c) and d1); as described immediately above with the difference that step c) will refer to "mixing the organic solution of reduced carbon nanotubes obtained in step a) with . . . "; and/or may further comprise a centrifugation step a1), as described previously.

Once the deposition has been performed and the solvent(s) has/have been eliminated, the nanocarbon compounds then interact with the surface and remain stabilised on the surface.

Thus, there is also provided the use of an air-metastable aqueous or organic suspension of fully exfoliated nanocarbon obtainable according to a method of the invention, for depositing nanocarbon materials on a substrate. For example, the air-metastable aqueous or organic suspension of fully exfoliated nanocarbon obtainable according to a method of the invention may be used for the preparation of transparent conducting films.

The depositing step can be carried out by a simple deposition (drop-casting) of a quantity of aqueous suspension or organic suspension of nanocarbon on a substrate, followed by the evaporation of the aqueous and/or organic solvent so as to isolate the nanocarbon compounds.

The depositing step d1) can also be carried out by application, for example using a brush or any other tool allowing the deposition of a nanocarbon suspension film onto a substrate.

Nanocarbon depositing can also be carried out by dip-coating. For example, the substrate can be dipped into the aqueous or organic suspension of nanocarbon for some time so as to allow the adsorption of the nanocarbon material on the surface of the substrate. The substrate may then be removed from the aqueous or organic suspension, preferably with a uniform speed to obtain a uniform coating, and the water and/or the organic solvent may then be evaporated from the substrate.

Nanocarbon depositing can also be implemented by spin coating. For example, a droplet of aqueous or organic suspension of nanocarbon can be deposited on a rotating substrate, optionally at high temperature. Preferably, the rotation is kept constant during the whole process so as to obtain a uniform coating, and the water and/or the solvent is then evaporated. When the spin coating is carried out at high temperature, the temperature can be between 10 and 200° C.

Nanocarbon depositing can be performed by spray-coating, optionally on a heated substrate.

Nanocarbon depositing can be performed by diverse ways of coating, such as roll to roll deposition, Dr Blade coating, and the like.

Such methods are known to the persons skilled in the art who will know how to adapt the experimental conditions depending on the parameters such as the nature of the substrate, interactions between the substrate and the nanocarbons, the wettability of the substrate by the nanocarbon aqueous suspension or organic suspension, and other relevant parameters the persons skilled in the art will appreciate.

The substrates that may be used include, in a non limiting way, ceramics, metals, glass, silica, silicon, molybdenite (MoS2), mica, graphite and/or plastics. Advantageously, the substrate can be any known substrate which is used and/or adapted to depositing carbon nanotubes, nanodiamonds, carbon nanohorns, graphene and fullerenes-type materials. For example, the substrate can be HOPG (highly oriented pyrolytic graphite), $Si/SiO_2$ wafers, mica, glass, $MoS_2$ and all kinds of plastics suitable for that purpose.

In exemplary embodiments, the substrate can be functionalised or modified prior to depositing the nanocarbon material. Generally speaking, any surface modification method known to the person skilled in the art can be used. The selection of the modification type will depend on the nature of the substrate, the aqueous solution used (water or ionic solution), the organic solvents (A, A', B, B') used and the desired physico-chemical interactions at the substrate surface for improving the quality of the nanocarbon deposits.

All the variants and embodiments described above with respect to:
- The type of nanocarbon used;
- The optional tube opening treatment of carbon nanotubes;
- The nanocarbon intercalation compounds and methods for preparing them;
- The aprotic organic solvents of step a) and/or step a');
- The organic solution of reduced nanocarbon obtained in step a);
- The re-oxidation step b);
- The absence of re-oxidation step b), advantageously when the carbon nanocarbon materials may be carbon nanotubes;
- The optional centifugation step a1);
- The degassing means for the solvents of step c) (water and ionic aqueous solution included);
- The organic solvents (B) and (B') of step c), including ionic species content and ability to support ionization of a salt species;
- The pH adjustment of water used in step c), alone or in mixture with (B) or (B');
- The pH adjustment of the ionic aqueous solution referred to in step c), alone or in mixture with (B) or (B');
- The means for removing the aprotic organic solvents in step d);
- The uses/applications of the suspensions of nanocarbon obtained in step c) or d);

are applicable mutatis mutandis to the "step d) variant" and "film/deposits" embodiments described above, including the composite applications described below.

In another aspect, the present invention also provides air-metastable aqueous suspensions of fully exfoliated nanocarbons obtainable by a method according to the invention.

In yet another aspect, the present invention also provides air-metastable organic suspensions of fully exfoliated nanocarbons obtainable by a method according to the invention.

In yet another aspect, the present invention also provides air-metastable aqueous or organic suspensions of fully exfoliated graphene characterized in that the Raman spectrum of the aqueous or organic suspension presents a symmetrical 2D band (also referred to as "G' band"), that can be fitted with a Lorentzian function with an Adjusted R-Square greater than 0.98, of full width at half maximum (FWHM) 45 cm$^{-1}$, preferably 40 cm$^{-1}$, more preferably 35 cm$^{-1}$, most preferably 30 cm$^{-1}$. Advantageously, the air-metastable aqueous or organic suspensions of fully exfoliated graphene may be surfactant-free.

The air-metastable aqueous or organic suspensions of fully exfoliated graphene may also be characterized by absorption spectroscopy. In exemplary embodiments, the air-metastable aqueous or organic suspensions of fully exfoliated graphene exhibit a UV-visible absorption peak at $\lambda_{max}$=269 nm. Advantageously, the air-metastable aqueous or organic suspensions of fully exfoliated graphene may be surfactant-free.

The air-metastable aqueous or organic dispersions of fully exfoliated graphene may also be characterized by the absence of surfactant. As such, the present invention also provides surfactant-free air-metastable aqueous or organic dispersions of fully exfoliated graphene.

The solvent of the aqueous suspension of fully exfoliated graphene may be degassed mixture of water or an ionic aqueous solution, with a degassed organic solvent (B), a degassed mixture (B') of organic solvents, or a degassed mixture of B or B' with an aprotic organic solvent (A) or a mixture (A') of aprotic organic solvents.

The solvent of the organic suspension of fully exfoliated graphene may be a degassed organic solvent (B), a degassed mixture (B') of organic solvents, or a degassed mixture of B or B' with an aprotic organic solvent (A) or a mixture (A') of aprotic organic solvents.

In exemplary embodiments, the air-metastable aqueous or organic suspension of fully exfoliated graphene contains mainly, if not only, single layer graphene.

In exemplary embodiments, single layer graphene present in the air-metastable aqueous or organic suspension of fully exfoliated graphene represents at least 50%, more preferably at least 75%, most preferably at least 90%, of carbonaceous material in the suspension. In other words, in exemplary embodiments, multilayer graphene present in the air-metastable aqueous or organic suspension of fully exfoliated graphene represents less than 50%, more preferably less than 25%, most preferably less than 10%, of carbonaceous material in suspension.

In exemplary embodiments, single layer graphene in the air-metastable aqueous or organic suspension of fully exfoliated graphene is present at a concentration 0.01 g/L, preferably 0.05 g/L, preferably 0.10 g/L, preferably 0.16 g/L.

In yet another aspect, the present invention also provides surfactant-free air-metastable aqueous or organic suspensions of individualized carbon nanotubes. The presence of individualized carbon nanotubes in the suspensions may be characterized by photoluminescence. This technique has been used since 2002 as proof of the presence of individualized carbon nanotubes (cf. [38]).

As used herein, the term "surfactant" refers to any substance which, at concentrations of 1 mM or 0.05% w/w (whichever may be the lowest) and at 25° C., reduces water-hexane interfacial tension by more than 2 mN/m.

Suspensions of carbon nanotubes in organic or aqueous solvents have been reported, some of which may contain individualized carbon nanotubes. However, in every case, the suspensions of individualized carbon nanotubes were obtained by sonication in the presence of a surface active agent. An example of such report is the work by O'Connell et al. [38].

In stark contrast, the aqueous or organic suspensions of individualized carbon nanotubes according to the present invention are surfactant-free. In addition, the individualized carbon nanotubes are not obtained via sonication (which damages the nanotubes). Instead, a mild dissolution technique is used, leading to aqueous or organic suspensions of individualized carbon nanotubes of greater quality (individualized carbon nanotubes with fewer defects/damages) as compared to known suspensions of carbon nanotubes.

Accordingly, there are provided aqueous or organic suspensions of fully individualized carbon nanotubes characterized by the absence of any aggregates visible with the naked eye or with an optical microscope in the absence of any surfactant. Examination of the organic or aqueous suspension of carbon nanotubes under optical microscope allows detecting possible aggregates having a minimal size of the order of one micron. For example, a suspension sample can be analysed with an optical microscope having a magnification of 10 to 100 to confirm the absence of carbon nanotube aggregates.

Carbon nanotubes have a strong tendency to aggregate, and in the absence of a surfactant, they will aggregate unless the carbon nanotubes are put in suspension according to the method of the present invention. That is why all known methods to prepare aqueous or organic suspensions of carbon nanotubes resort to the use of a surfactant to maintain the carbon nanotubes in suspension. For the first time, the inventors provide a method to prepare air-metastable suspensions of individualized carbon nanotubes, without any surfactant, and surfactant-free aqueous or organic suspensions of individualized carbon nanotubes.

In exemplary embodiments, the solvent of the aqueous suspension of individualized carbon nanotubes may be degassed mixture of water or an ionic aqueous solution, with a degassed organic solvent (B), a degassed mixture (B') of organic solvents, or a degassed mixture of B or B' with an aprotic organic solvent (A) or a mixture (A') of aprotic organic solvents.

The solvent of the organic suspension of individualized carbon nanotubes may be a degassed organic solvent (B), a degassed mixture (B') of organic solvents, or a degassed mixture of B or B' with an aprotic organic solvent (A) or a mixture (A') of aprotic organic solvents.

In exemplary embodiments, the carbon nanotubes may be single-walled (SWCNT), double-walled (DWCNT), few-walled (FWCNT) or multi-walled (MWCNT) carbon nanotubes, preferably single-walled, double-walled or few-walled carbon nanotubes, most preferably single-walled carbon nanotubes.

In exemplary embodiments, the carbon nanotubes may advantageously be subjected to a tube opening pre-treatment prior to carrying out step a). The person skilled in the art can find ample source of information about known methods to open tubes. See for example Doped Carbon Nanotubes, J. Sloan, M. Monthioux, in Carbon Meta-Nanotubes: Synthesis, Properties and Applications, 1st Ed. Marc Monthioux Ed., John Wiley & Sons (2012), 225-271. [48]

For example, carbon nanotubes may be opened by heating them under air until they lose a certain amount of weight. To do so, a sample may be placed in a thermogravimetric analysis apparatus (TGA) and weight loss under air may be monitored upon heating. Then a real sample, placed in an oven, under air may be heated with the same heating ramp as in TGA and taken out of the oven when a specific temperature corresponding to a specific weight loss is reached. Actual weight loss may be verified afterwards by weighing the resulting sample. Depending on the nanotube source, the optimum weight loss may be determined by balancing sufficient nanotube opening versus nanotube damaging and material loss (i.e., when an acceptable ratio between (i) sufficient nanotube opening and (ii) nanotube damaging and material loss is obtained).

As the reader will appreciate, some commercial CNTs are already opened. The determination of whether CNTs may be opened may be effected by dispersing them in water with mild sonication. If the CNTs fall to the bottom, they are opened. If they float, they are closed.

Opened CNTs may be processed in the method of the present invention exactly in the same way as the conventional CNTs. Advantageously, the use of opened CNTs in the method of the invention lead to more concentrated and more stable dispersions, than when the method is carried out with conventional CNTs that have not been subjected to a tube-opening pre-treatment.

The aqueous or organic suspensions of fully exfoliated graphene and individualized carbon nanotubes may be obtained by a method according to the present invention, using any variant described herein. Accordingly, all the variants and embodiments described above with respect to:

The type of starting nanocarbon used (graphite or carbon nanotubes);
The aprotic organic solvents (A) or (A');
The organic solvents (B) and (B'), including ionic species content and ability to support ionization of a salt species;
The pH of water, used alone or in mixture with (A), (A'), (B) and/or (B');
The pH of the ionic aqueous solution used alone or in mixture with (A), (A'), (B) and/or (B');
The uses/applications of the organic or aqueous suspensions of fully exfoliated graphene or individualized carbon nanotubes, including the composite applications described below;

are applicable mutatis mutandis to the aqueous or organic suspensions of fully exfoliated graphene and individualized carbon nanotubes embodiments described above.

Composites

In another aspect, the present invention also provides the use of aqueous nanocarbon suspensions (aqueous inks) obtainable by a method of the invention, for the preparation of composite materials.

In yet another aspect, the present invention also provides the use of organic nanocarbon suspensions (organic inks) obtainable by a method of the invention, for the preparation of composite materials.

In exemplary embodiments, the present invention also provides the use of air-metastable aqueous or organic suspensions of fully exfoliated graphene characterized in that the Raman spectrum of the suspension presents a symmetrical 2D band (also referred to as "G' band"), that can be fitted with a Lorentzian function with an Adjusted R-Square greater than 0.98, of full width at half maximum (FWHM) ≤45 $cm^{-1}$, preferably ≤40 $cm^{-1}$, more preferably ≤35 $cm^{-1}$, most preferably ≤30 $cm^{-1}$, for the preparation of composite materials.

In exemplary embodiments, the present invention also provides the use of surfactant-free air-metastable aqueous or organic suspensions of individualized carbon nanotubes, for the preparation of composite materials.

For example, the composite material may be obtained by a method including a step of mixing an aqueous or organic nanocarbon ink, preferably an organic nanocarbon ink, according to the invention and a polymer solution or a polymer mixture. The polymer may be any polymer suitable for mixing with an aqueous or organic nanocarbon ink according to the invention.

Advantageously, the fully exfoliated nanocarbon and/or aqueous or organic nanocarbon ink obtainable by the method of the invention can be used for preparing electronic or microelectronic components such as capacitors or transistors.

Advantageously, the composite material may comprise, in addition to the nanocarbon particles, other materials conventionally used in composite materials, for example fillers.

The fillers used in the composition of said composite materials can have a nanometric and/or micrometric size.

"Nanometric size material" as used herein refers to a material whose size is of a few nanometers in at least one of the space dimensions. For example, the size of the material in at least one of the space dimensions is between 0.3 and 20 nm, preferably between 0.3 and 2 nm.

"Micrometric size material" as used herein refers to a material whose size is between 1 and 100 microns.

The composite material may comprise only micrometric size fillers, or only nanometric size fillers, or a mixture of micro and nanometric size fillers (see for example FR 2 873

381 [30] where composite materials comprising nano- and micro-metric fillers in the same material are described).

The methods described in the present document solve the current major problems that hamper the research developments in the field of nanocarbon structures: the lack of air-stable or air-metastable liquid formulation of fully exfoliated nanocarbons. It thus provides for fully exfoliated nanocarbon suspensions that can be handled under ambient atmosphere. Additionally, these inks are surfactant free.

The inventors of the present invention are the very first investigators to develop a general nanocarbon suspending method in water, ionic aqueous solutions, binary water-organic solutions or organic solvents containing fully exfoliated nanocarbons. There are a variety of reports in the scientific literature about aqueous surfactant containing formulations, prepared by sonication or stirring. [Paton, K. R. et al. Scalable production of large quantities of defect free few-layer graphene by shear exfoliation in liquids. *Nat. Mater.* 13, 624-630 (2014)] [23] However, as indicated even in the title of said publication, the resulting "graphenes" are not fully exfoliated and distribution of thickness is between 1 and 15 layers with a broad maximum around 5 layers. Thus, the inks (nanocarbon aqueous suspensions) according to the present invention are far superior in at least two respects: (i) the nanocarbons are fully exfoliated (see FIG. 6 (AFM height distribution peaked at one layer) and FIG. 11 (film thickness showing no more than 2 layers homogeneous thickness), (ii) the inks are surfactant free.

Likewise, the dissolution of a nanocarbon salt in a polar aprotic solvent has been reported (cf. ref. [11-13] and [24]). However, the resulting nanocarbon mixture is air-sensitive and cannot be handled at ambient atmosphere. In the variant of the present invention where the water or ionic aqueous solution is replaced by an organic solvent (B) or an organic solvent mixture (B'), air-metastable organic suspensions of fully exfoliated nanocarbons may be obtained, something unheard of up to now.

From an industrial point of view, clearly the possibility to obtain aqueous and/or organic nanocarbon suspensions/inks is an important element in the nanotechnologies and composite materials industries, since it is a crucial element for pushing technical progress forward in this field.

This discovery goes against the preconceived notion of the person skilled in the art according to which it was considered impossible to solubilize nanocarbon materials in water or aqueous solutions (i.e., binary water-organic solvent solutions) or organic solvents.

Thus, the method of the present invention very advantageously leads to the first (to our knowledge) aqueous suspensions (aqueous inks) of fully exfoliated nanocarbons.

Additionally, in another aspect, the method of the present invention very advantageously leads to the first (to our knowledge), air-metastable, organic suspensions (organic inks) of fully exfoliated nanocarbons.

Other advantages will readily appear to the person skilled in the art upon reading the examples that follow, as illustrated by the appended Figures given for illustrative purposes.

BRIEF DESCRIPTION OF THE FIGURES

FIG. 4 depicts an absorption spectrum of the graphene suspension in water of Example 1a.

FIG. 5 shows Transmission Electronic Microscopy (TEM) images of graphene flakes from graphene suspensions of Example 1a.

FIG. 11 shows a transmittance spectrum of a graphene thin film prepared by vacuum filtration from a graphene dispersion in water of Example 1a.

FIG. 13A shows Data corresponding to FIG. 1A: Position ($cm^{-1}$), full width at half maximum (FWHM, $cm^{-1}$) and relevant intensity ratios at 2.33 eV.

FIG. 13B shows: Data corresponding to FIG. 2: Position ω ($cm^{-1}$), linewidth Γ ($cm^{-1}$), and relevant intensity ratios as a function of excitation energy. *$I_{2D}/I_G$ could not be measured properly at 1.17 eV because of strong absorption bands of water in the near infrared.

EQUIVALENTS

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

Exemplification

The method of this invention and its applications can be understood further by the examples that illustrate some of the embodiments by which the inventive method may be reduced to practice. It will be appreciated, however, that these examples do not limit the invention. Variations of the invention, now known or further developed, are considered to fall within the scope of the present invention as described herein and as hereinafter claimed.

The present invention will now be exemplified using certain nanocarbon materials but it will be understood this is not meant to limit the invention to those specific nanocarbon materials.

EXAMPLES

Example 1: Preparation of a Suspension of Graphene in Water

Example 1a 200 mg of $KC_8$ (STREM Chemicals) was dispersed in 100 mL of THF under inert atmosphere and this mixture was tightly sealed and mixed for 4 days on a magnetic stirrer (800 rpm). After stirring, the dispersion was left to stand overnight to allow large graphite aggregates to form and settle at the bottom. The mixtures were centrifuged in 10 mL glass vials at 3000 2000 rpm for 20 minutes. The top two thirds of the solution was extracted by a pipet and retained for use. Optical absorption measurements and light scattering measurements were taken on this sample.

Figure 8:
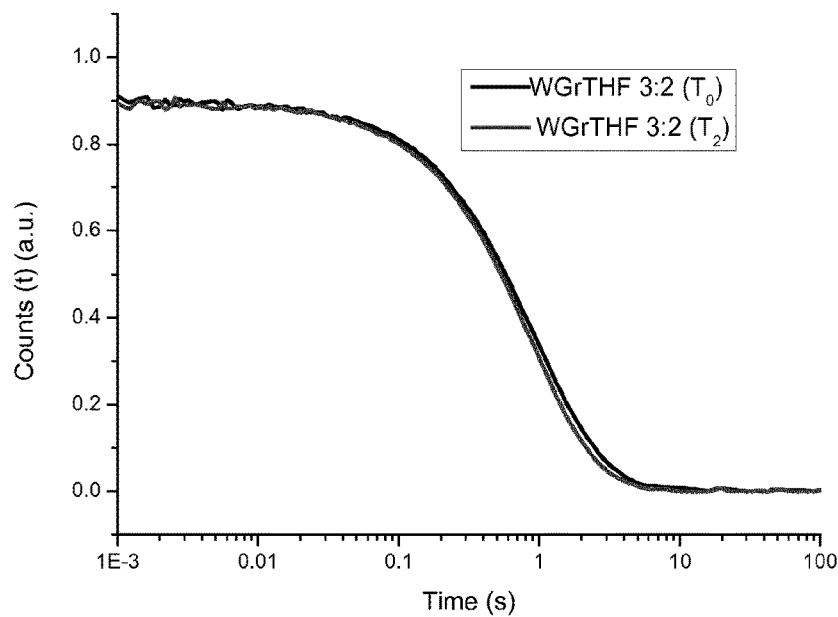
FIG. 8 shows Dynamic Light Scattering (DLS) data measured at 90° showing scattering properties of a graphene dispersion in water of Example 1a with no significant changes two weeks after preparation.

Distilled water was degassed for thirty minutes. and was heated in a water bath at 75° C. for 30 minutes. The graphenide solution was left to oxidize under ambient conditions for one minute. Using a syringe pump, 4 ml (2 parts) of graphenide solution in THF was added to 6 ml (3 parts) of degassed water drop by drop whilst stirring gently to prepare sample labelled WGrTHF3:2 (FIG. 8). The THF was evaporated at room temperature for 72 hours whilst stirring gently every two hours to yield a clear dispersion of graphene in water with a graphene concentration of 0.35 mg/mL. A different concentration (0.53 mg/mL) of Graphene dispersion in water was also prepared by adding equal volumes of reduced graphene solution in THF (6 mL) to an equal volume of water (6 mL). (This was repeated in examples 2 and 3).

Example 1b

Graphenide Solution 108 mg of KC8 was dispersed in 18 mL of distilled THF under inert atmosphere and this mixture was tightly sealed and mixed for 6 days on a magnetic stirrer (900 rpm). After stirring, the dispersion was left to stand overnight to allow large graphite aggregates to form and settle at the bottom. The mixtures were centrifuged in 10 mL glass vials at 3000 rpm for 20 minutes. The top two thirds of the solution was extracted by a pipette and retained for use.

Transfer of Graphene from THF to Water

The graphenide solution was left to oxidize under ambient conditions for one minute. Graphene was transferred to water by adding a graphenide solution in THF to degassed water, followed by THF evaporation. In brief, a carefully cleaned magnetic teflon bar stirrer was introduced in the water (200 mL) to be degassed to induce the nucleation of gas bubbles. The water was subjected to mild agitation under pressure of 0.2 mbar for 30 min of degassing. Then the air pressure on the flask was gently increased back to atmospheric pressure. 4 ml of degassed water was transferred to a previously rinsed 20 mL glass vial; this was followed by a drop-wise addition of graphenide solution (after its air oxidation for one minute) using a pipette with gentle stirring using a stainless steel needle. The vial was left open in a dust free environment to allow the THF to evaporate at room temperature whilst stirring gently with a stainless steel needle every hour for the first ten hours and occasionally thereafter to yield a slightly dark dispersion of graphene in water. Different graphene concentrations in water were made by mixing different volumes of the THF graphenide solution to the degassed water volume ratios. After evaporating the THF, the graphene was kept in a tightly sealed vial. The dispersions were characterized using absorption spectroscopy, Raman spectroscopy, dynamic light scattering.

Transmission Electron Microscopy: The graphene dispersions were drop-cast on holey carbon grids for TEM characterization. Structural and morphological characterization of the material has been performed on FEI Tecnai F20 ST transmission electron microscope (TEM), operated at 120 kV of accelerating voltage to reduce the beam damage on the graphene, while preserving the resolution to image (0,0,2) graphite fringes for the measurement of the local thickness on folded edges. Local elemental analysis has been performed in-situ in the TEM using an EDAX energy dispersion X-ray spectrometer (EDX). A different graphene dispersion was used to produce deposits for AFM characterization. The graphene dispersion used to produce AFM deposits on mica were made using the conditions and protocols similar to those described above were used, with the difference that degassed water was replaced with a degassed aqueous 1 mM solution of $AsPh_4Cl$. The resulting graphene dispersions were dropcast on freshly cleaved mica surfaces for AFM analysis.

Figure 12:
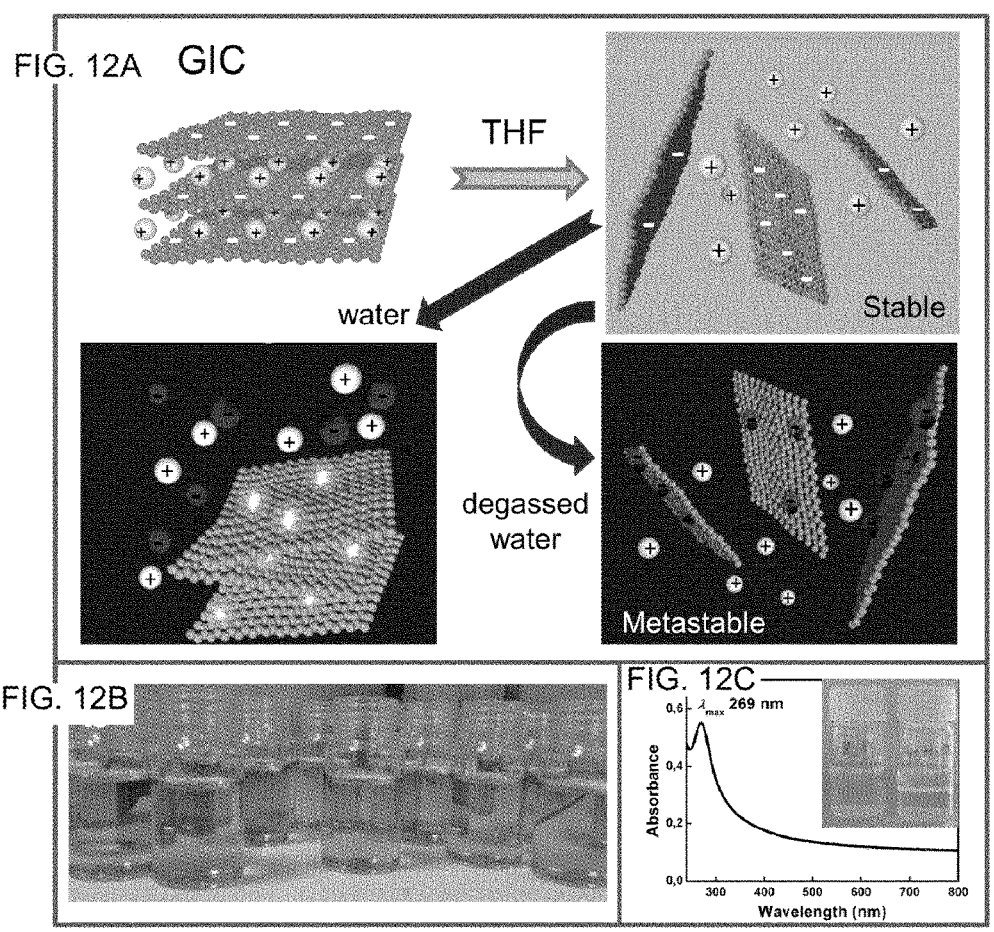
FIG. 12A illustrates an exemplary method for the preparation of aqueous graphene dispersions according to the invention. Specifically, KC8, a graphite intercalation compound (GIC), is solubilized in THF under inert atmosphere in the form of single layer graphenide polyions. Graphenide ions are then oxidized back to graphene in THF by air exposure and immediately transferred to degassed water. The stability of the aqueous graphene suspension is determined by the interaction between the individual graphene plates. In regular laboratory conditions, gases dissolved in water (about 1 mM) adsorb on the graphene surface, inducing long-range attractive interaction between the dispersed objects and promoting aggregation (FIG. 1A bottom left). On the contrary, if water is degassed (removing dissolved gases) water-ions readily adsorb on the graphene surface, conferring a certain charge to the dispersed objects. The repulsive electrostatic interaction favors the stability of the dispersed material (FIG. 1A bottom right).
FIG. 12B shows several vials of air stable aqueous SLG dispersion at 0.16 g/L obtained according to Example 1b.
FIG. 12C shows a UV-visible absorption spectrum of a graphene dispersion in water of Example 1b showing an absorption peak at the exact wavelength reported for the absorption of a single layer of graphene on a substrate [30].

The overall results of Example 1b, are schematized in FIG. 12A. In regular laboratory conditions, gases dissolved in water (about 1 mM) adsorb on the graphene surface, inducing long-range attractive interaction between the dispersed objects and promoting aggregation. On the contrary, if water is degassed (removing dissolved gases) water-ions readily adsorb on the graphene surface, conferring a certain charge to the dispersed objects. The repulsive electrostatic interaction favors the stability of the dispersed material. Electrophoresis measurements show that the dispersed graphene becomes negatively charged in water, indicating that preferential adsorption of OH— is taking place.

The graphene samples were characterized by Raman spectroscopy, which is a powerful tool notably to determine number of layers, stacking sequence in the case of multiple layers, doping, amount and nature of defects, . . . Raman spectra of the dispersions are reported in FIGS. 1A and 2 and show spectra typical of graphene.

Although many articles and companies claim «graphene» or «single layer graphene» dispersions, suspensions or solutions, no such dispersions existed prior to the present invention. By dispersing graphite with the help of mechanical energy (which is the technique typically used for preparing "graphene dispersions"), one goes against thermodynamics, to break apart the efficient packing of graphene in graphite. Hence, the resulting dispersion has to be a statistical distribution of thickness with single layers forming the tail of that distribution. This is in fact what is seen in e.g. [23].

In contrast, if one starts from an already fully exfoliated system, such as the graphenide solutions in organic solvents of ref [12] and [47], the inventors discovered that all that is needed is an energy barrier to circumvent graphene re-aggregation. Degassing the water, ionic aqueous solution, organic solvent (B), mixture (B') of organic solvents, or mixture of (B) or (B') with water or an aqueous ionic solution (step c) in the inventive method affords that barrier without the need for any additive, apart from the naturally present OH⁻ ions. Eventually, higher graphene concentrations can be obtained by lowering or raising the pH or adding other ions such as ammonium ($NH_4^+$) or substituted ammonium ions such as tetrasubstituted ammonium ions, for example alkylammonium salts, such as tetraalkylammonium salts e.g. $Bu_4N^+$; hydrophobic ions such as, but not limited to, $BF_4^-$, $PF_6^-$ or $AsF_6^-$; urate ions; phenyl containing ions such as tetraphenyl phosphonium, tetraphenylborate ($B^-$ $Ph_4Na^+$) or tetraphenylarsonium ($As^+Ph_4Cl^-$); polyarylsubstituted ions such as naphthalenyl, anthracenyl, pyrenyl, perylenyl radicals, etc . . . bearing a polar moiety (e.g., 1-pyrene sulfonic acid salts, 2-Naphtoxyacetic acid salts, 2-naphthalenesulfonate salts, or urate salts of these, preferably 1-pyrene sulfonic acid salts or 2-Naphtoxyacetic acid salts).

Figure 1:
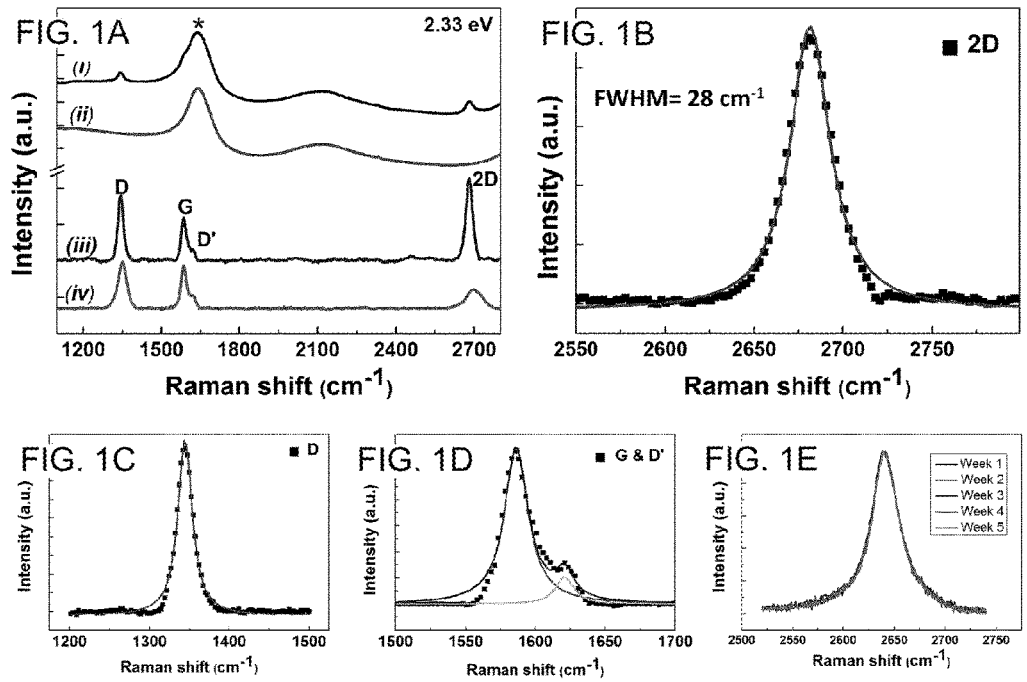
FIG. 1A shows Raman spectra at 2.33 eV of graphene suspension in water (i), of water (ii) and the resulting graphene spectrum after water subtraction (iii). Additionally, the spectrum of graphene suspensions with bile salt prepared according to experimental details of ref. 32 is represented (iv). The graphene suspension having spectrum (i) was prepared according to Example 1b. The superior exfoliation of degassed dispersions is readily apparent from the shape and height of the 2D band in spectrum (iii) vs spectrum (iv). Spectra (iii) and (iv) were obtained by subtraction of the spectrum for pure water from that of the dispersions (iii) and (iv) respectively in the same cuvette, normalized on the bending peak of water (peak flagged with a "*").
FIGS. 1B-1D show typical fits of the 2D, D, G and D' peaks of single layer graphene ("SLG") in water at 2.33 eV from the graphene suspension prepared according to Example 1b. The slight asymmetry in the fit of the 2D line is due to imperfections in the water background subtraction. The 2D band shown on FIG. 1B has an adjusted R-square of 0.9895.
FIG. 1E shows Raman 2D band as a function of time (at 1.94 eV) for the graphene suspension prepared according to Example 1b, showing excellent time stability.
Figure 2:
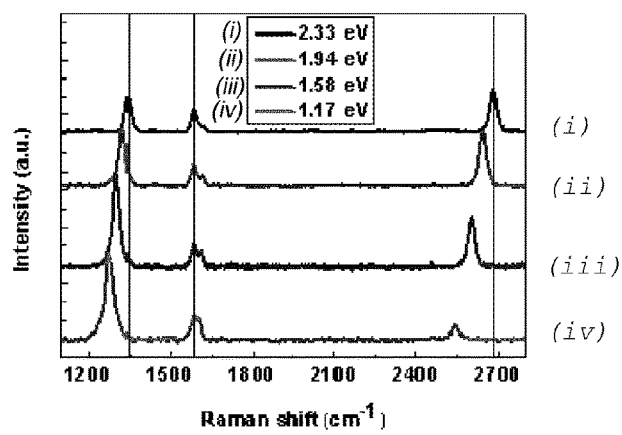
FIG. 2 shows Raman spectra of the graphene suspension in water of Example 1b at different energies. All graphene spectra have been obtained by substraction of the spectrum for pure water from that of the graphene suspension in the same cuvette, normalized on the water peak. Note that the same procedure was applied on heavy water where the water signal is far away from the G band and the same results were obtained. The G band is situated at 1587+/−2 $cm^{-1}$ at all energies. D band at ca 1300 $cm^{-1}$ and 2D band at ca 2600 $cm^{-1}$ are dispersive and their position evolve with energy as expected. The intense-symmetrical (one lorentzian lineshape) and narrow (full width at half maximum (FWHM)=28 cm−1) 2D band is characteristic of single graphene layers.

Single Layeredness:

The Raman spectrum of water dispersions of fully exfoliated graphene according to the invention is reported in FIG. 1 (e.g., spectrum (iii) in FIG. 1A). It shows typical features of SLG such as a narrow, symmetrical, 2D (also called G') band of full width at half maximum (FWHM) below 30 cm$^{-1}$. Good fits of the 2D, D, G and D' peaks are obtained using single Lorentzian lines (FIGS. 1B-D). It is interesting to compare the Raman spectrum of the degassed aqueous dispersions of graphene according to the invention with other aqueous dispersions, such as sonication-aided sodium cholate (SC) suspensions prepared according to ref [32] (spectrum (iv) in FIG. 1A). Quality of the exfoliation is readily apparent from the much sharper and more intense 2D band for the degassed dispersion according to the invention (spectrum (iii)) while the D band is only slightly enhanced compared to sonication-aided dispersions (spectrum iv). Finally, stability of these aqueous dispersions of fully exfoliated graphene according to the invention is addressed in FIG. 1E where the temporal evolution of the Raman 2D band is presented. No apparent change can be seen after at least five weeks of storage. Likewise, light scattering experiment show no change over a five week period. A key Raman signature of single layer graphene (SLG) is the shape and width of the 2D (G') band. Multilayer, AB stacked (Bernal) few layer graphene shows a 2D band with a complex shape fitted by a number of Lorentzian lines [40]. Turbostratic graphite, i.e. graphite with uncorrelated graphene layers along the c axis, shows a single Lorentzian 2D band with a FWHM of 50 cm⁻ [40,41]. On the other hand, the 2D band of SLG can be well fitted by a single Lorentzian of FWHM between 20 and 35 cm$^{-1}$ on most substrates for an excitation line at 2.33 eV [35, 42-44]. Likewise, suspended graphene shows a 2D FWHM of 28+/−2 cm⁻ [45]. Therefore, the observed 2D band at 2681 cm$^{-1}$ (at 2.33 eV) with a pure Lorentzian shape and a FWHM of 28 cm$^{-1}$ (and a dispersion of 119 cm$^{-1}$/eV) indicates that the degassed aqueous dispersions of graphene according to the invention contain mainly, if not only, single layer graphene. Furthermore, the position and width of the Raman 2D band of degassed aqueous graphene dispersions according to the invention match closely those of supported graphene on $SiO_2$ [46]. The other characteristics of the Raman spectra are in agreement with the literature for SLG.

In summary, we have prepared dispersions with a majority of single layer graphene in water with no surfactant or any other stabilizer characterized by a Raman spectrum where the 2D band is of Lorentzian shape, and has a full width below 40 cm−1.

Minimal defects. From the analysis of the defect-induced bands D and D', (data relative to position co (cm−1) and linewidth F (cm−1) and relevant intensity ratios as a function of excitation energy) further information can be obtained about the amount and nature of defects.

Following Tuinstra & Koenig [37] and Ferrari & Robertson, [33, 34] Cançado et al. analyzed the Raman spectra of graphene with controlled amounts of defects. [35] In particular, The $I_D/I_G$ ratio goes through a maximum as a function of defect concentration.

The degassed aqueous dispersions described herein pertain to the low defect range (called «stage I», [33] since the G band is not dispersive and both D and G bands have low linewidths (respectively 27 and 21 cm$^{-1}$ at 2.33 eV) compared to the observed values in the range of 40 to 60 cm–1 (D band) and 30 to 40 cm–1 (D band) for stage II defective graphene. [35]

Figure 3:
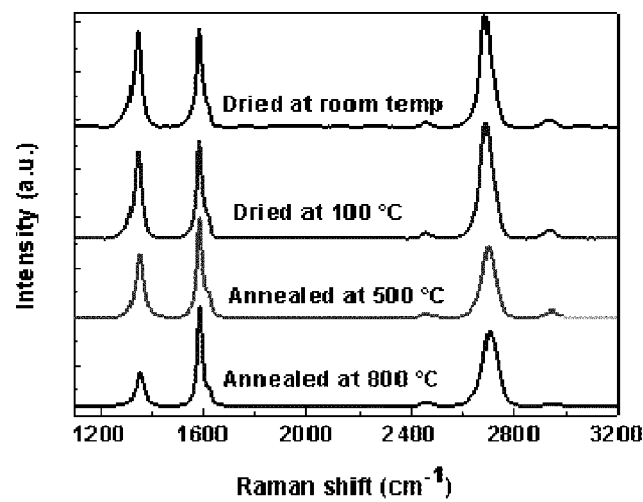
FIG. 3 shows a Raman spectrum of graphene deposits from the graphene suspension of Example 1b.
Figure 4:
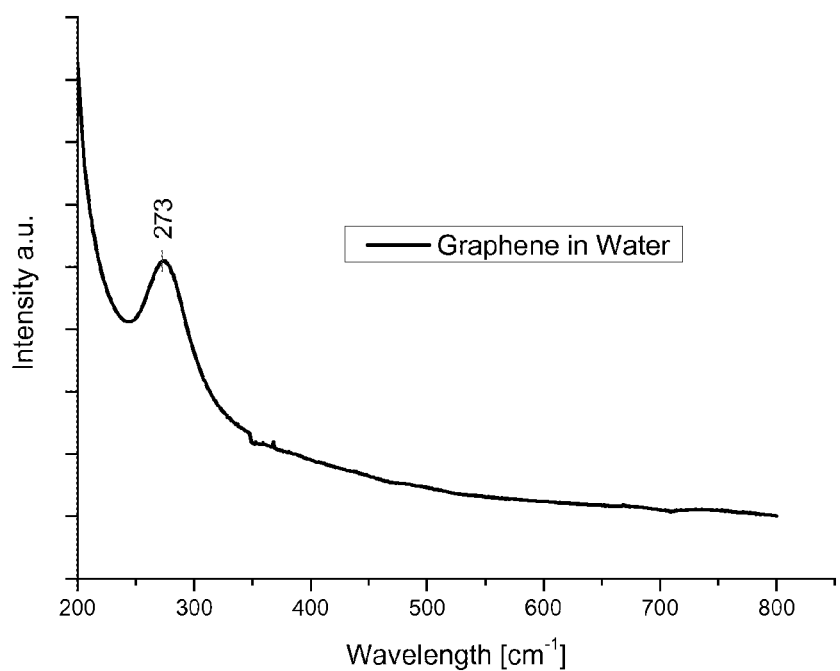
Figure 5:
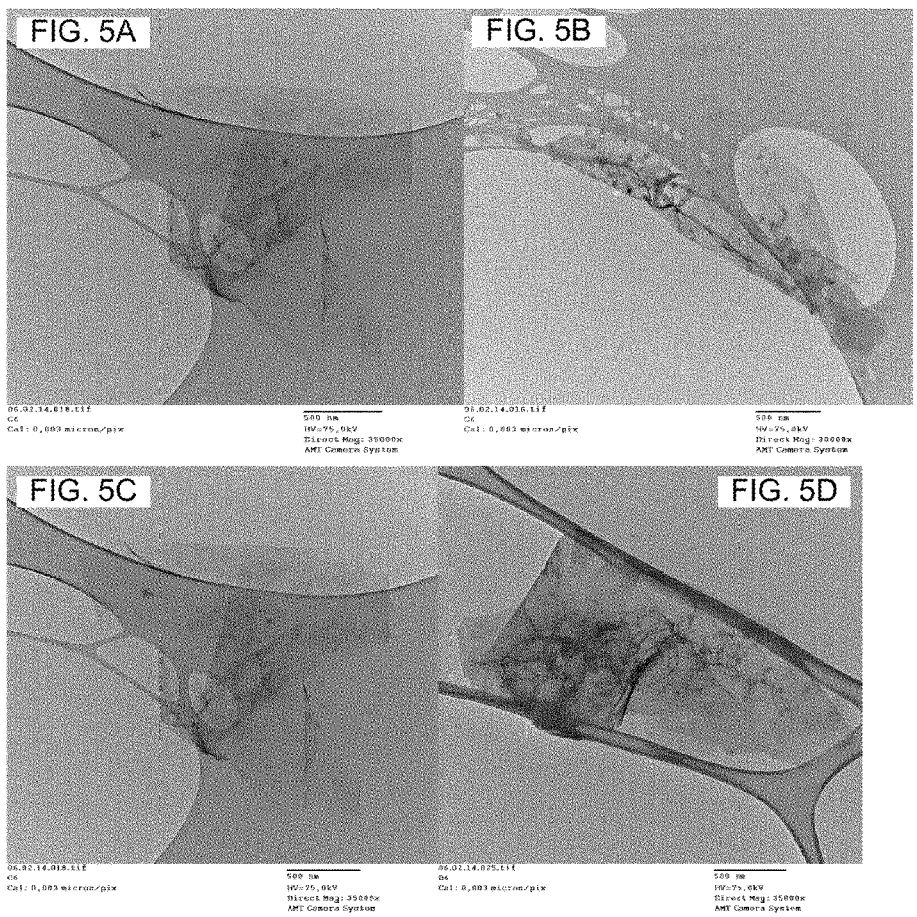
Figure 6B:
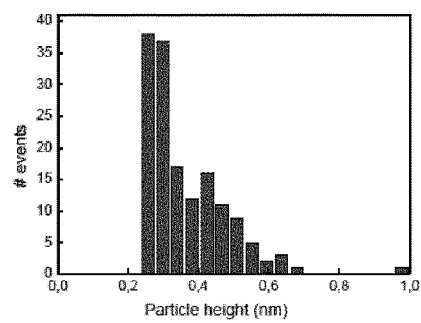
FIG. 6 shows Atomic Force Microscopy Height image (FIG. 6B) and related height statistics of the graphene flakes from graphene suspensions of Example 1a (FIG. 6A). If one sets a threshold at 0.51 nm (i.e. halfway between the expected respective thicknesses of single (0.34 nm) and double (0.68 nm) layers), the image shown has 92% single layer and 7% double layer graphene flakes.
Figure 6:
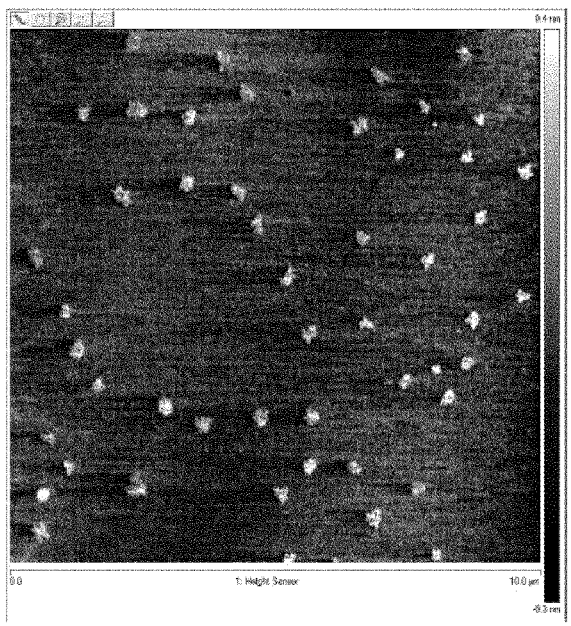
Figure 7:
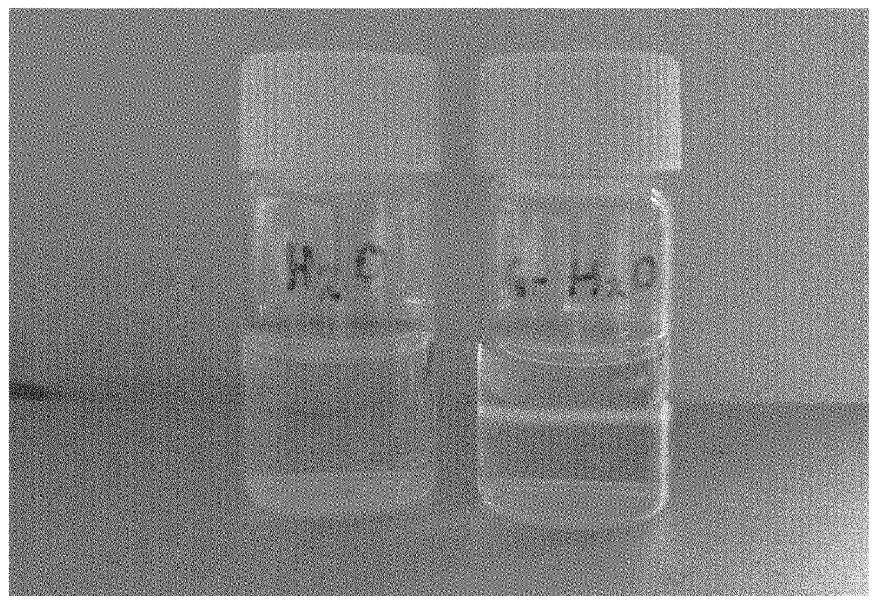
FIG. 7 shows a laser beam shined through water (left vial) and a graphene suspension in water of Example 1b (right vial). The laser goes through water unscattered (left) whereas a graphene dispersion (right) shows Tyndall effect due to light scattering by large (colloidal size) graphene flakes.

An $I_D/I_G$ value of 1.5 at 2.33 eV accounts for 0.06% defects, most of which being edges. The amount of defects introduced can thus safely be considered as minimal. Furthermore, those can be mostly eliminated after a heat treatment of the deposits at 450° C. lowering the ID/IG value to 0.7 (FIG. 3). In FIG. 1A, spectra for the degassed aqueous dispersions and sonication aided sodium cholate (NaC) prepared according to ref [32], are shown together. Quality of the exfoliation is readily apparent from the much sharper and more intense 2D band for the degassed dispersion.

General Discussion:

To the best of our knowledge, there was no report so far of Raman investigations of high yield SLG dispersed in liquids. The highest SLG yield achieved so far was by ultrasonication of graphite followed by ultracentrifugation in NMP: 21% SLG for c≈1.8 g/l [31] and 33% SLG for c≈0.11 g/l [36]. On the other hand, Lotya et al reported some Raman characterisations of graphene flakes dispersed in aqueous suspensions using sodium cholate as dispersing agent (c≈0.3 g/l), but the flakes consisted of 1 to 10 stacked layers with about 20% of SLG [32]. A scalable method of few graphene layers was recently reported, replacing sonication by high shear mixing. It shows a wide thickness distribution centered on 5 layers and up to ca 15 layers [23]. The degassed aqueous dispersions thus represent the very first liquid preparation where all graphene is present as single layers, for a reasonable concentration of 0.16 mg/ml.

Figure 10:
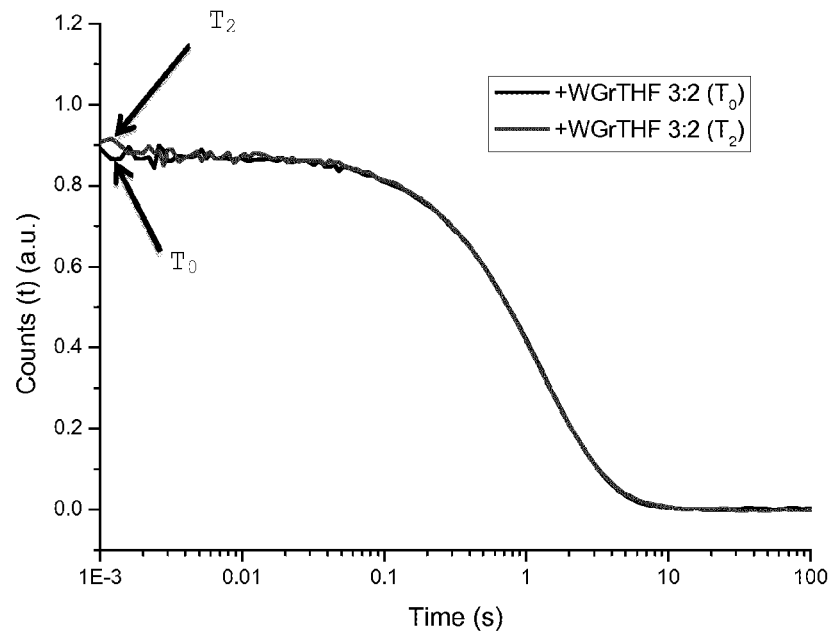
FIG. 10 shows Dynamic Light Scattering (DLS) data measured at 90° showing scattering properties of a graphene dispersion in water of Example 1a stabilised by a positively charged salt with no significant changes two weeks after preparation.
Figure 11:
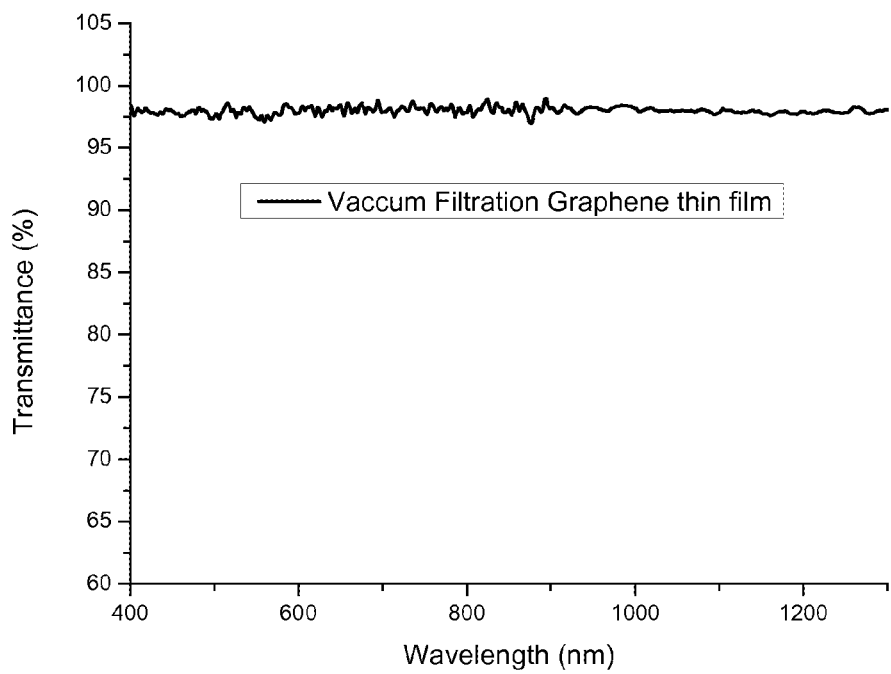

Example 2: Preparation of a Graphene Suspension in an Aqueous Solution of AsPh$_4$Cl Conditions and protocols similar to those of Example 1 were used, with the difference that degassed water was replaced with a degassed aqueous 1 mM solution of AsPh$_4$Cl to prepare sample +WGrTHF3:2 (FIG. 10).

A clear suspension of graphene in aqueous solution of AsPh4Cl with a graphene concentration of 0.35 mg/mL is obtained.

Figure 9:
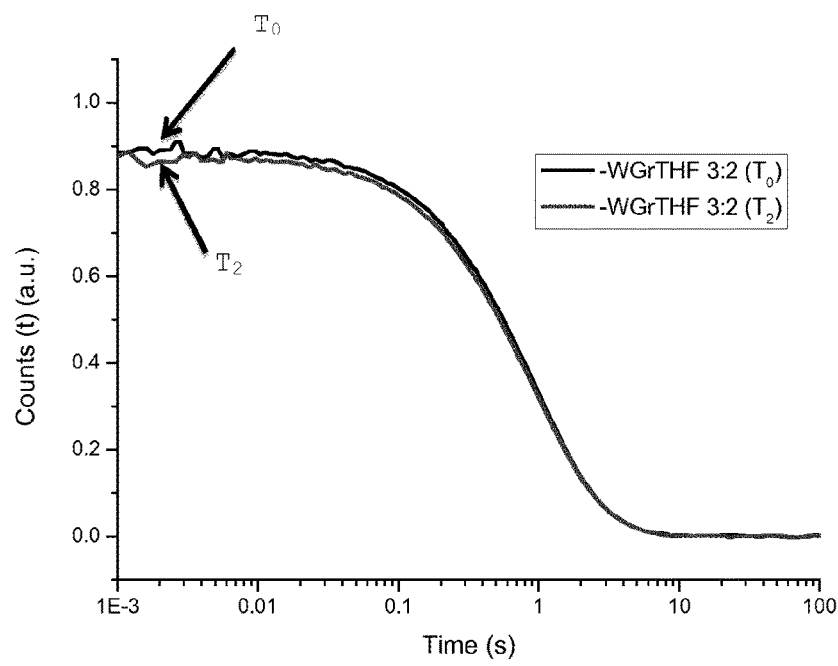
FIG. 9 shows Dynamic Light Scattering (DLS) data measured at 90° showing scattering properties of a graphene dispersion in water of Example 1a stabilised by a negatively charged salt with no significant changes two weeks after preparation.

Example 3: Preparation of a Graphene Suspension in an Aqueous Solution of NaBPh$_4$ Conditions and protocols similar to those of Example 1 were used, with the difference that degassed water was replaced with a degassed aqueous 1 mM solution of NaBPh$_4$ to prepare sample -WGrTHF3:2 (FIG. 9).

A clear suspension of graphene in aqueous solution of NaBPh$_4$ with a graphene concentration of 0.35 mg/mL is obtained.

Example 4: Preparation of a Suspension of Carbon Nanotubes in Water

A salt of SWCNTs of KC$_8$ stoichiometry was prepared using a gas phase reaction. 11.5 mg of SWCNTs (Tubal from OCSiAl) and 5.25 mg potassium were separately added to a pyrex tube under an inert atmosphere, and the tube was evacuated to 10$^{-4}$ mbar and sealed. The tube containing the SWCNTs and potassium was heated at 250° C. for two days. 0.5 mg of the produced salt of SWCNTs was dispersed in 10 mL of THF on a magnetic stirrer at 900 rpm for 24 hours. The mixture was centrifuged at 4000 rpm for 30 mins. The top two thirds of the solution was extracted by a pipet and retained for use. Optical absorption measurements and light scattering measurements were taken on this sample.

Distilled water was degassed for thirty minutes. Using a syringe pump, 2 ml (1 part) of reduced SWCNT solution in THF was added to 2 ml (1 part) of degassed water drop by drop whilst stirring gently to prepare sample W_SWCNT_THF. The THF was evaporated at room temperature for 72 hours whilst stirring gently every two hours to yield a clear suspension of SWCNTs in water. Optical absorption measurements and light scattering measurements were taken on this sample. This suspension was used to make deposits on different substrates using drop casting and stamping.

Example 5: Preparation of a Dispersion of Carbon Nanotubes in a Water and DMSO

A salt of carbon nanotubes was prepared by reacting potassium and SWCNT in an evacuated tube at 250° C. for three days. 2 mg of the resulting salt was exposed to 20 ml of DMSO with stirring for three days under inert atmosphere. The resulting solution was centrifuged at 3000 rpm for 20 minutes, to yield a 0.067 mg/mL solution of reduced SWNT in DMSO. Inside the glove box under inert atmosphere, 1 part of this solution of reduced SWNT in DMSO was diluted by adding one part of a NaTPhB DMSO solution (1 mM) to yield a solution of NaTPhB-reduced SWNT in DMSO (0.5 mM), where NaTPhB designates sodium tetraphenylborate. The resulting solution was injected into an equal volume of a degassed NaTPhB water solution (1 mM) with a polypropylene pipette. The degassed NaTPhB water solution was obtained by degassing a solution of NaTPhB in distilled water for thirty minutes. The injecting technique allowed the two liquids to mix and no further agitation was required. The resulting dispersion was closed and kept for characterization using Raman spectroscopy, absorption spectroscopy and thin film deposition.

For Examples 1-5, the nanocarbon suspensions in water were characterized in solution by light scattering measurements, absorption spectroscopy measurements and Raman spectroscopy.

Thin films were prepared by vacuum filtration onto mixed cellulose ester membranes (Millipore, 0.025 μm pore size, 47 mm diameter). Films were deposited on glass and silicon substrates using dip coating, drop casting and stamping.

When reading the present application and the above illustrating examples, the person skilled in the art will appreciate that the present method has a general scope and is generally applicable to nanocarbon materials, as defined in the present document.

While we have described a number of embodiments of this invention, it is apparent that our basic examples may be altered to provide other embodiments that utilize methods of this invention and fully exfoliated nanocarbon materials obtained therefrom. Therefore, it will be appreciated that the scope of this invention is to be defined by the appended claims rather than by the specific embodiments that have been represented by way of example.

LIST OF REFERENCES

[1] Schaffer, M. S. P., Windle, A. H., "Fabrication and Characterization of Carbon Nanotube/poly (vinyl alcohol) Composites", *Adv. Mater.*, 11, pp 937-941 (1999)
[2] Ye, Y., Ahn, C. C., Witham, C., Fultz, B., Liu, J., Rinzler, A. G., Colbert, D., Smith, K. A., Smalley, R. E., "Hydrogen Absorption And Cohesive Energy Of Single-Walled Carbon Nanotubes", *App. Phys. Lett.*, 74, pp 3072309 (1999)
[3] Liu, C., Fan, Y. Y., Liu, M., Gong, H. T., Cheng, H. M., Dresselhaus, M. S., "Hydrogen Storage In Single-Walled Carbon Nanotubes At Room Temperature", *Science*, 286, pp 1127-1129 (1999)
[4] Kong, J., Chapline, M. G., Dai, H., "Functionalized Carbon Nanotubes For Molecular Hydrogen Sensors", *Adv. Mater.* 13, 1384-1386 (2001)
[5] Aldissi, M.; Schmitz, B.; Lazaro, E.; Bhamidipati, M.; Dixon, B., "Conducting Polymers In Ultracapacitor Applications", 56th Annu. Tech. Conf.—Soc. Plast. Eng., (Vol. 2), pp 1197-1201 (1998)
[6] An, K. H.; Kim, W. S.; Park, Y. S.; Moon, J.-M.; Bae, D. J.; Lim, S. C.; Lee, Y. S.; Lee, Y. H. "Electrochemical Properties Of High-Power Supercapacitors Using Single-Walled Carbon Nanotube Electrodes", *Adv. Funct. Mater.* 11, pp 387-392 (2001)
[7] Yu, R., Chen, L., Liu, Q., Lin, J., Tan, K.-L., Ng, S. C., Chan, H. S. O., Xu, G.-Q., Hor, T. S. A. "Platinum Deposition On Carbon Nanotubes Via Chemical Modification", *Chem. Mater.* 10, pp 718-722 (1998)
[8] Planeix, J. M.; Coustel, N.; Coq, B.; Brotons, V.; Kumbhar, P. S.; Dutartre, R.; Geneste, P.; Bernier, P.; Ajayan, P. M., "Application Of Carbon Nanotubes As Supports in Heterogeneous Catalysis", *J. Am. Chem. Soc.* 116, pp 7935-7936 (1994)
[9] Tans, S. J., Verschueren, A. R. M., Dekker, C., "Room-Temperature Transistor Based On A Single Carbon Nanotube", *Nature* 393, pp 49-52 (1998)
[10] Bechtold, A.; Hadley, P.; Nakanishi, T.; Dekker, C., "Logic Circuits With Carbon Nanotube Transistors". *Science* 294 pp 1317-1320 (2001)
[11] WO 2005/073127
[12] WO 2009/056696
[13] WO 2011/154894
[14] Ljima, S. "Helical Microtubules of Graphitic Carbon." *Nature*, 354, 56-58 (1991)
[15] Azami et al., *J. Phys. Chem.*, 112, 1330-1334 (2008)
[16] U.S. Pat. No. 7,501,024
[17] Zhang et al., *J. Phys. Chem. C*, 113, 11184-11186 (2009)
[18] Penicaud et al., "Doped Carbon nanotubes", Chapter 2, in Carbon Meta-Nanotubes: Synthesis, Properties and Applications, 1st Ed. Marc Monthioux Ed., John Wiley & Sons (2012), pp. 41-111
[19] "Synthesis of graphite intercalation compounds", A. Herold in Chemical physics of intercalation, A. P. Legrand and S. Flandrois Eds, NATO ASI Series, series B, Vol. 172, pp. 3-45 (1987)
[20] C. Stein, J. Poulenard, L. Bonnetain, J. Golé, C. R. Acad. Sci. Paris 260, 4503 (1965)
[21] "Synthesis of graphite intercalation compounds", A. Herold in Chemical physics of intercalation, A. P. Legrand and S. Flandrois, Eds, NATO ASI Series, series B, Vol. 172, pp. 3-45 (1987)
[22] F. Béguin and R. Setton New ternary lamellar compounds of graphite, *Carbon* 13, 293-295 (1975)
[23] Paton, K. R. et al. «Scalable production of large quantities of defect free few-layer graphene by shear exfoliation in liquids", *Nat. Mater.*, 13, 624-630 (2014)
[24] A. Pénicaud, F. Dragin, G. Pécastaings, M. He, E. Anglaret, "Concentrated Solutions of Individualized Single Walled Carbon Nanotubes" *Carbon,* 67, 360-367 (2014)
[25] Lee, R. S., Kim, H. J., Fischer, J. E. & Thess, A. letters to nature Conductivity enhancement in single-walled carbon nanotube bundles doped with K and Br. *Nature* 255-257 (1997)
[26] Hebard, A. F.; Rosseinsky, M. J.; Haddon, R. C.; Murphy, D. W.; Glarum, S. H.; Palstra, T. T. M.; Ramirez, A. P.; Kortan, A. R. *Nature,* 350, 600 (1991)
[27] Hodge, S. A., Fogden, S., Howard, C. A., Skipper, N. T. & Shaffer, M. S. P. Electrochemical Processing of Discrete Single-Walled Carbon Nanotube Anions. *ACS Nano* 7, 1769-1778 (2013).
[28] Chakraborty et al., Angew. Chem. Int. Ed., 46, 4486-4488 (2007)
[29] Stankovitch et al., Nature, 2006, 442, 282-286
[30] FR 2 873 381
[31] Khan, U., O'Neill, A., Lotya, M., De, S., & Coleman, J. N. High-Concentration Solvent Exfoliation of Graphene. Small, 6(7), 864-871 (2010)
[32] Lotya, M., King, P. J., Khan, U., De, S., & Coleman, J. N. High-concentration, surfactant-stabilized graphene dispersions. *ACS nano*, 4(6), 3155-3162 (2010)
[33] Ferrari, A. C., & Robertson, J. Interpretation of Raman spectra of disordered and amorphous carbon. *Physical review B*, 61(20), 14095 (2000)
[34] Ferrari, A. C., & Basko, D. M. Raman spectroscopy as a versatile tool for studying the properties of graphene. *Nature nanotechnology*, 8(4), 235-246 (2013)
[35] Cancado, L. G., Jorio, A., Ferreira, E. M., Stavale, F., Achete, C. A., Capaz, R. B., . . . & Ferrari, A. C. Quantifying defects in graphene via Raman spectroscopy at different excitation energies. *Nano letters*, 11(8), 3190-3196 (2011)
[36] Torrisi, F., Hasan, T., Wu, W., Sun, Z., Lombardo, A., Kulmala, T. S., . . . & Ferrari, A. C. Inkjet-printed graphene electronics. *Acs Nano*, 6(4), 2992-3006 (2012)
[37] F. Tuinstra, J. L. Koenig, Raman Spectrum of Graphite. *J. Chem. Phys.* 53, 1126 (1970)
[38] M. J. O'Connell et al., *Science,* 297, 593-596 (2002)
[39] V. G. Kravets et al., *Phys. Rev. B,* 81, 1-6 (2013)
[40] L. M. Malard et al., *Phys. Rep.,* 473, 51-87 (2009)
[41] P. Lespade et al., *Carbon N.Y.,* 22, 375-385 (1984)
[42] Y. Y. Wang et al., *J. Phys. Chem. C,* 112, 10637-10640 (2008)
[43] A. Eckmann et al., *Phys. Rev. B,* 88, 035426-11 (2013)
[44] E. M. Ferreira et al., *Phys. Rev. B,* 82, 125429-9 (2010)
[45] Z. H. Ni et al., *ACS Nano,* 3, 569-574 (2009)
[46] S. Berciaud et al., *Nano Lett.,* 9, 346-52 (2009)
[47] A. Catheline et al., *Soft Matter.* 8, 7882 (2012)
[48] J. Sloan, M. Monthioux, "Doped Carbon Nanotubes", in Carbon Meta-Nanotubes: Synthesis, Properties and Applications, 1st Ed. Marc Monthioux Ed., John Wiley & Sons (2012), pp. 225-271
[49] Damien Voiry, Olivier Roubeau and Alain Pénicaud, "Stoichiometric control of single walled carbon nanotubes functionalization", *J. Mater. Chem.*, 20, 4385-4391 (2010)

[50] P. Petit, C. Mathis, C. Journet, P. Bernier, Tuning and monitoring the electronic structure of carbon nanotubes. *Chem. Phys. Lett.* 305, 370-374 (1999)

The invention claimed is:

1. A method for preparing aqueous or organic suspensions of fully exfoliated nanocarbon materials, comprising:
   - (0) providing a nanocarbon intercalation compound comprising at least two negatively charged individual nanocarbons intercalated by positive counter ions;
   - (a) dissolving the nanocarbon intercalation compound in an aprotic organic solvent (A) or a mixture (A') of aprotic organic solvents under inert atmosphere; thereby leading to an organic solution of reduced nanocarbon material;
   - (a') optionally, adding a suitable ionic species to the organic solution of reduced nanocarbon material obtained in step (a), under inert atmosphere; prior to step (b);
   - (b) re-oxidation to revert the reduced nanocarbon material to its neutral state to lead to an organic suspension of neutral nanocarbon material in the organic solvent (A) or a mixture (A') of aprotic organic solvents; and
   - (c) mixing the organic suspension of neutral nanocarbon obtained in step (b) with a suitable amount of degassed water, degassed ionic aqueous solution, degassed organic solvent (B), degassed mixture (B') of organic solvents, or degassed mixture of (B) or (B') with water or an aqueous ionic solution;
   wherein solvent (A) or solvent mixture (A') is fully or partially water-miscible or fully or partially miscible with solvent (B) or solvent mixture (B'); thereby leading to an air-metastable aqueous or organic suspension of nanocarbon material.

2. A method according to claim 1, wherein the nanocarbon material is a carbon nanotube and the nanocarbon intercalation compound is a carbon nanotube alkali salt having the formula MCx, wherein x represents an integer ranging from 6 to 500, and M represents an alkali metal.

3. A method according to claim 1, wherein the nanocarbon material is a carbon nanotube and the nanocarbon intercalation compound is a carbon nanotube alkali salt having the formula KCx, wherein x represents an integer with a C:K stoichiometry ranging anywhere between $KC_6$ and $KC_{500}$.

4. A method according to claim 1, wherein each of the following:
   - degassed water,
   - degassed ionic aqueous solution,
   - degassed organic solvent (B),
   - degassed mixture (B') of organic solvents,
   - degassed mixture of (B) or (B') with water or an aqueous ionic solution, used in step c), contains ionic species.

5. A method according to claim 4, wherein the ionic species are ions able to adsorb on the carbon surface of the nanocarbons.

6. A method according to claim 4, wherein the ionic species include $OH^-$, $H_3O^+$, ammonium ($NH_4^+$) or substituted ammonium ions that include alkylammonium salts, hydrophobic ions, or ionic species susceptible of π-π interactions with the nanocarbons.

7. A method according to claim 6 wherein the ionic species are hydrophobic ions.

8. A method according to claim 7, wherein the hydrophobic ions are phenylsubstituted ions, polyarylsubstituted ions, urate ions, $BF_4^-$, $PF_6^-$, $AsF_6^-$.

9. A method according to claim 1, wherein a degassed mixture of (B) or (B') with an aqueous ionic solution is used in step (c), which is prepared by:
   - (i) a method comprising a step of mixing (B) or (B') with water, and then adding one or more suitable compounds that yield one or more of the ionic species able to adsorb on the carbon surface of the nanocarbons; or
   - (ii) a method comprising a step of mixing (B) or (B') with an ionic aqueous solution containing one or more ionic species able to adsorb on the carbon surface of the nanocarbons.

10. A method according to claim 9, wherein the ionic species is selected from one or more of $OH^-$, $H_3O^+$, ammonium ($NH_4^+$), substituted ammonium ions, tetraalkylammonium salts, $Bu_4N^+$, $BF_4^-$, $PF_6^-$ or $AsF_6^-$, urate ions; phenyl containing ions, tetraphenyl phosphonium, tetraphenylborate ($B^-Ph_4Na^+$), tetraphenylarsonium($As^+Ph_4Cl^-$), polyarylsubstituted ions bearing a polar moiety, 1-pyrene sulfonic acid salts, 2-Naphtoxyacetic acid salts, 2-naphthalenesulfonate salts, or urate salts of these, 1-pyrene sulfonic acid salts, 2-Naphtoxyacetic acid salts.

11. A method according to claim 1, wherein re-oxidation step b) spontaneously occurs when exposing the solution obtained in step (a), or in step (a') when variant (a) and (a') is used, to air or water, or is carried out by:
   - allowing the organic solution of reduced nanocarbon material obtained in step (a), or in step (a') when variant (a) and (a') is used, to stand at ambient atmosphere;
   - bubbling oxygen gas or dry air through the organic solution of reduced nanocarbon material obtained in step (a), or in step (a') when variant (a) and (a') is used;
   - adding a suitable oxidant, different than oxygen, in the solution of reduced nanocarbon material obtained in step (a), or in step (a') when variant (a) and (a')" is used; in which case step (b) is optionally carried out under inert atmosphere;
   - mixing the organic solution of reduced nanocarbon material obtained in step (a), or in step (a') when variant (a) and (a') is used, with a suitable amount of degassed organic solvent (B) or degassed mixture (B') of organic solvents, containing a suitable oxidant different than oxygen, provided that (B) and (B') are aprotic organic solvents; in which case step (b) is optionally carried out under inert atmosphere; or
   - oxidizing the reduced nanocarbon material solution obtained in step (a), or in step (a') when variant (a) and (a')" is used, by electrochemical means; in which case step (b) is optionally carried out under inert atmosphere.

12. A method according to claim 11, wherein the oxidant is selected from one or more of iodine, $FeCl_3$ or $NOPF_6$.

13. A method according to claim 1, wherein an organic solvent mixture (A') is used in step (a) and/or in step (a').

14. A method according to claim 13, wherein the organic solvent mixture (A') is a binary, ternary, or higher-order solvent mixture.

15. A method according to claim 1, wherein the aprotic organic solvent(s) (A) or (A') used in step (a) and/or in step (a'), have a dielectric constant $\varepsilon \geq 4$.

16. A method according to claim 1, wherein the aprotic organic solvent (A) is selected from tetrahydrofuran (THF), methyl-THF (Me-THF), dimethylsulfoxide (DMSO), N-methylpyrrolidone (NMP), dimethylformamide (DMF), N-methylformamide (NMF), sulfolane, acetone, acetonitrile, nitromethane, dimethoxyethane (DME), ethylacetate, 2-butanone, methyl tert-butyl ether (MTBE), diethyl ether, CycloPentylMethylEther (CPME) or dichloromethane; and mixture (A') is selected from mixtures of two or more of the aprotic organic solvents (A).

17. A method according to claim 1, further comprising a step (d) of removing the aprotic organic solvent (A) or mixture (A') of aprotic organic solvents from the aqueous or organic mixture obtained in step (c).

18. A method according to claim 1, wherein a single aprotic organic solvent is used in step (a) and/or in step (a').

19. A method according to claim 1, further comprising a step (d1) of depositing the aqueous or organic suspension of fully exfoliated nanocarbon obtained in step (c) or (d) on a substrate.

20. A method according to claim 1, wherein the organic solvents used in step (c), as solvent (B) or mixture (B'), are any organic solvent that is miscible with aprotic organic solvent (A) or aprotic organic solvent mixture (A').

21. A method according to claim 1, wherein the organic solvents used in step (c), as solvent (B) or mixture (B'), are any organic solvent that can support ionization of a salt species and/or that can allow partial or full dissociation of a salt species.

22. A method according to claim 21, wherein the salt species is one that leads to ionic species able to adsorb on the carbon surface of the nanocarbons.

23. A method according to claim 1, wherein the organic solvents used in step (c), as single solvent (B) or mixture (B'), are selected from:
tetrahydrofuran (THF), methyl-THF (Me-THF), dimethylsulfoxide (DMSO), N-methylpyrrolidone (NMP), dimethylformamide (DMF), N-methylformamide (NMF), sulfolane, acetone, acetonitrile, nitromethane, dimethoxyethane (DME), ethylacetate, 2-butanone, methyl tert-butyl ether (MTBE), diethyl ether, CycloPentylMethylEther (CPME) or dichloromethane; and mixture (A') is selected from mixtures of two or more of these; alcohols selected from the group consisting of methanol, ethanol, n-propanol, i-propanol, n-butanol, 2-butanol, n-pentanol, 2-pentanol, n-hexanol and mixtures thereof;
esters selected from the group consisting of methyl acetate, ethyl acetate, propyl acetate, butyl acetate, methyl propionate and mixtures thereof;
ketones selected from the group consisting of acetone, butanone, 2-pentanone, 3-pentanone, cyclopentanone, cyclohexanone and mixtures thereof;
aromatic solvents selected from the group consisting of benzonitrile, nitrobenzene, chlorobenzene, dichlorobenzene and mixtures thereof; or
halogenated solvents.

24. A method according to claim 1, wherein mixture (B') comprises one or more non-polar organic solvents that would not on its own support ionization of a salt species, provided that the overall solvent mixture (B') supports sufficient ionization to stabilize the suspension of nanocarbon material.

25. A method according to claim 1, wherein mixture (B') comprises one or more non-polar organic solvent such as benzene, toluene, methyl naphthalene, diethyl ether, CycloPentylMethylEther (CPME), pentane, hexane, heptane, cyclohexane, 1,4-dioxane, mixed in with a sufficient amount of at least one organic solvent able to support ionization of a salt species, so that the overall mixture (B') allows dissociation of a salt species generating ionic species able to adsorb on the surface of the nanocarbon surface, wherein the ionic species includes $OH^-$, $H_3O^+$, ammonium ($NH_4^+$), substituted ammonium ions, alkylammonium salts, hydrophobic ions, or ionic species susceptible of π-π interactions with the nanocarbons.

26. A method according to claim 1, wherein mixture (B') is a mixture of (i) a water-miscible organic solvent that includes an alcohol selected from the group consisting of methanol, ethanol, n-propanol, i-propanol, n-butanol, 2-butanol, n-pentanol, 2-pentanol, or n-hexanol, and (ii) one or more non-polar organic solvent selected from the group consisting of benzene, toluene, methyl naphthalene, diethyl ether, CycloPentylMethylEther (CPME), pentane, hexane, heptane, cyclohexane, 1,4-dioxane.

27. A method according to claim 1, wherein step (c) involves mixing the organic suspension of neutral nanocarbon obtained in step (b) with a suitable amount of degassed ionic aqueous solution, or degassed mixture of (B) or (B') with an aqueous ionic solution; and the ionic aqueous solution is an aqueous solution containing $OH^-$, $H_3O^+$, $BF_4^-$, $Pf_6^-$, $AsF_6^-$, urate ions, ammonium or substituted ammonium ions selected from the group consisting of alkylammonium salts (e.g. $Bu_4N^+$), tetraphenylborate, tetraphenylphosphonium, tetraphenylarsonium ions.

28. A method according to claim 1, wherein the nanocarbon material is carbon nanotubes, nanodiamonds, carbon nanohorns, graphene, fullerenes-type materials, cup stacked carbon nanotubes or carbon nanocones or any hydrogenated or partially hydrogenated forms thereof.

29. A method according to claim 1, wherein solvent A or mixture of solvent A' is degassed before using it in step (a) or (a').

30. A method according to claim 1, wherein the nanocarbons are carbon nanotubes, and the carbon nanotubes are subjected to a tube opening pre-treatment prior to carrying out step (a).

31. A method for preparing aqueous suspensions of fully exfoliated nanocarbon material, comprising steps of:
(0) providing a nanocarbon intercalation compound comprising at least two negatively charged individual nanocarbons intercalated by positive counter ions;
(a) dissolving a nanocarbon intercalation compound in a water-miscible aprotic organic solvent having a boiling point lower than that of water and a dielectric constant $\varepsilon \geq 4$ at 25° C., under inert atmosphere; thereby leading to an organic solution of reduced nanocarbon material;
(b) re-oxidation to revert the reduced nanocarbon material to its neutral state to lead to an organic suspension of neutral nanocarbon material in the organic solvent (A) or a mixture (A') of aprotic organic solvents;
(c) mixing the organic suspension of neutral nanocarbon obtained in step (b) with a suitable amount of degassed water, degassed ionic aqueous solution, or degassed mixture of (B) or (B') with water or an aqueous ionic solution; and
(d) removing the water-miscible aprotic organic solvent from the aqueous mixture of step (c), thereby leading to an aqueous suspension of fully exfoliated nanocarbon.

32. A method according to claim 31, wherein the water-miscible aprotic organic solvent of step (a) is tetrahydrofuran (THF), acetone, acetonitrile, dimethoxyethane (DME), ethylacetate, 2-butanone, methyl tert-butyl ether (MTBE), diethyl ether, dichloromethane, petroleum ether, CycloPentylMethylEther (CPME); or THF.

33. A method for preparing air-metastable organic suspensions of fully exfoliated nanocarbon materials, comprising steps of:
(0) providing a nanocarbon intercalation compound comprising at least two negatively charged individual nanocarbons intercalated by positive counter ions;
(a) dissolving a nanocarbon intercalation compound in an aprotic organic solvent (A) having a dielectric constant ε≥4 at 25° C., under inert atmosphere; thereby leading to an organic solution of reduced nanocarbon material;

(b) re-oxidation (removal of electrons) to revert the reduced nanocarbon material to its neutral state to lead to an organic suspension of neutral nanocarbon material in the organic solvent (A) or a mixture (A') of aprotic organic solvents;

(c) mixing the organic suspension of neutral nanocarbon obtained in step b) with a suitable amount of degassed organic solvent (B) having a dielectric constant ε≥2 at 25° C. and a boiling point greater than that of the aprotic organic solvent (A) of step (a); and (d) removing the aprotic organic solvent (A) from the aqueous mixture of step (c), thereby leading to an organic suspension of fully exfoliated nanocarbon in solvent (B).

34. A method according to claim 33, wherein the organic solvent (B) of step (c) is benzonitrile, nitrobenzene, chlorobenzene, dichlorobenzene, or an alcohol.

* * * * *